United States Patent [19]
Takakura

[11] Patent Number: 5,543,928
[45] Date of Patent: Aug. 6, 1996

[54] DIGITAL RECORDING AND/OR REPRODUCING APPARATUS WHICH REARRANGES ERROR CORRECTION BLOCKS REPRESENTING VIDEO SIGNAL AND CORRESPONDING TO DATA BLOCKS OF IMAGE REPRESENTED BY VIDEO SIGNAL

[75] Inventor: Eiichi Takakura, Chiba, Japan

[73] Assignee: Sharp Kabushiki Kaisha, Osaka, Japan

[21] Appl. No.: 334,103

[22] Filed: Nov. 4, 1994

Related U.S. Application Data

[63] Continuation of Ser. No. 17,293, Feb. 12, 1993, abandoned.

[30] Foreign Application Priority Data

Feb. 14, 1992 [JP] Japan .................................. 4-027618

[51] Int. Cl.$^6$ .................................................. H04N 5/76
[52] U.S. Cl. .................... 358/335; 360/33.1; 360/10.1; 348/390
[58] Field of Search ................................... 358/335, 310, 358/312, 328, 334; 348/384, 390; 360/32, 33.1, 8, 9.1, 10.1, 10.3

[56] References Cited

U.S. PATENT DOCUMENTS

| 5,175,631 | 12/1992 | Juri et al. | 358/335 |
| 5,237,424 | 8/1993 | Nishino et al. | 358/133 |
| 5,239,308 | 8/1993 | Keesen | 341/67 |

FOREIGN PATENT DOCUMENTS

| 0469860 | 2/1992 | European Pat. Off. . |
| 0470772 | 2/1992 | European Pat. Off. . |
| 0471118 | 2/1992 | European Pat. Off. . |
| 0471580 | 2/1992 | European Pat. Off. . |
| 0482888 | 4/1992 | European Pat. Off. . |
| 0509594 | 10/1992 | European Pat. Off. . |
| 0553405 | 8/1993 | European Pat. Off. . |
| 0559467 | 9/1993 | European Pat. Off. . |
| 61-55173 | 11/1986 | Japan . |
| 62-55204 | 11/1987 | Japan . |
| 2-220270 | 9/1990 | Japan . |
| 9102430 | 2/1991 | WIPO . |

OTHER PUBLICATIONS

U.S. Patent Application No. 08/005,382 filed Jan. 15, 1993.
Patent Abstracts of Japan, vol. 11, No. 329, May 27, 1987.
Patent Abstracts of Japan, vol. 14, No. 525, Nov. 19, 1990.
IEEE Transactions on Consumer Electronics, vol. 37, No. 3, Aug. 1991, pp. 261–266 "A Study on Trick Plays for Digital VCR," Yamamitsu et al.
IEEE Transactions of Consumer Electronics, vol. 38, No. 3, Aug. 1992, pp. 236–241, "A Study on New DCT–Based Bit Rate Reduction Algorithm and Variable Speed Playback . . ." Lee et al.

*Primary Examiner*—Tommy P. Chin
*Assistant Examiner*—Khoi Truong

[57] ABSTRACT

In a digital VCR, which carries out bit rate reduction coding of digital video signals for magnetically recording and reproducing the same, a plurality of blocks each including the digital video signal of a plurality of pixels are formed, and the digital video signals are encoded for each block. A code amount is controlled so that the code amount may be constant on the basis of one or more of the plurality of blocks, and encoding is carried out for correcting a possible error, whereby error correction blocks are formed. The error correction blocks are rearranged so that the error correction blocks included in the blocks, which are adjacent to each other in a screen, may be adjacent to each other on a recording medium, and the data for three rectangular regions, which are obtained by trisecting the screen with respect to the horizontal direction, may be recorded in corresponding three tracks. Thereby, mosaic deformation in a reproduced picture can be prevented.

28 Claims, 25 Drawing Sheets

AREA DETECTABLE
FROM TRACK

BOUNDARIES
OF FIELDS $A_1$  $B_1$  $C_1$

AREA DETERMINED AS DETECTABLE ON
THE BASIS OF BLOCKS IN HORIZONTAL
DIRECTION IN EACH REGION

NON-UPDATED
AREA CAUSING
DETERIORATION
OF PICTURE
QUALITY $A_1$  $B_1$  $C_1$

TRACK NO.   1        2        3
            1ST FIELD

TRACK NO.   1        2        3
            2ND FIELD

DIGITAL RECORDING AND/OR REPRODUCING APPARATUS WHICH REARRANGES ERROR CORRECTION BLOCKS REPRESENTING VIDEO SIGNAL AND CORRESPONDING TO DATA BLOCKS OF IMAGE REPRESENTED BY VIDEO SIGNAL

This application is a continuation, of application Ser. No. 08/017,293 filed on Feb. 12, 1993, now abandoned.

BACKGROUND OF THE INVENTION

1. Field of the Invention

The present invention relates to a digital recording and/or reproducing apparatus of a video signal, and more particularly, to a recording apparatus for carrying out bit rate reduction coding of a video signal and digitally recording the coded video signal on a recording medium, a reproducing apparatus capable of digitally reproducing a video signal at a changeable or extraordinary speed from a recording medium having such video signal recorded thereon, and a recording/reproducing apparatus having such digital recording and reproducing functions.

2. Description of the Background Art

In recent years, an apparatus has been developed for recording digitally a video signal on a recording medium and reproducing digitally the same from the recording medium. One such typical apparatus is the so-called digital video cassette recorder (referred to as "digital VCR" hereinafter) which is available for practical use. In such a conventional digital VCR, a digital video signal which is in a bit rate reduction coded (bandwidth compressed) state for the purpose of reducing the enormous amount of information to a level suitable for recording and reproduction is recorded on a magnetic tape and reproduced therefrom using a rotary head.

FIG. 1 is a block diagram schematically showing a structure of the conventional digital VCR using the bit rate reduction coding method. Such conventional digital VCR is disclosed in Japanese Patent Laying-Open No. 2-220270, for example.

Referring to FIG. 1, at the time of recording, a digital video signal provided from a video signal source not shown is supplied to a block shuffling circuit 101 included in a digital VCR. The block shuffling circuit 101 divides the digital video signal into a plurality of blocks, each of which is formed of a plurality of pixels and has a certain size, to rearrange the video signal data on the basis of such blocks.

Then, the digital video signal rearranged by the block shuffling circuit 101 is applied to a bit rate reduction coding circuit 102 where the bit rate reduction coding of data on the basis of each block is carried out to realize an amount of information suitable for recording onto a tape. More specifically, the video signal of each block entered into the bit rate reduction coding circuit 102 is subjected to the well-known orthogonal transform coding, and then subjected to a variable length coding process according to the information amount of each block. As a result, reduction of the data amount, i.e., bit rate reduction coding of the video signal is realized. The video signal is further supplied to an error correction coding circuit 103.

The error correction coding circuit 103 adds an error correction code (parity) to the block data thus subjected to bit rate reduction coding, and supplies the same to a synchronizing signal and ID signal applying circuit 104. The synchronizing signal and ID signal applying circuit 104 adds a synchronizing signal and an ID signal to the supplied video signal to provide the same to a modulation circuit 105.

The modulation circuit 105 modulates the supplied signal while suppressing the direct current (DC) component thereof to record the same on the above-described block basis on a magnetic tape 107 as a recording medium via a magnetic head 106.

At the time of reproduction, recorded data on the tape 107 are reproduced via a magnetic head 108 to be demodulated by a demodulation circuit 109. The demodulated video signal is supplied to a synchronizing signal and ID signal detection circuit 110 where detection of the synchronizing signal and ID signal is carried out. Then, the video signal is applied to an error correction decoding circuit 111.

The error correction decoding circuit 111 carries out error correction of the applied video signal. The corrected data is subjected to variable length decoding and inverse orthogonal transform processes for each block by a decoding and concealment circuit 112 to restore the original data of each block. On the other hand, concealment processing of a video signal is carried out for the portion of data where error correction could not be carried out in the error correction decoding circuit 111.

The data thus subjected to the error correction and decoding process is supplied to a block de-shuffling circuit 113 where the data is rearranged in a manner opposite to that by the block shuffling circuit 101 of the recording system. As a result, the video signal arranged in the original form, i.e., the same form as that at the time of recording is reproduced. The data signal of the block de-shuffling circuit 113 is output appropriately to be provided to a monitor device and the like not shown.

The digital VCR which processes the video signal on the basis of blocks as described above has the following disadvantage, compared with the digital VCR (e.g., D1-format digital VCR) which processes the video signal on the basis of pixels.

In the case where the video signal is processed on the basis of blocks, reproduction at an extraordinary speed such as a high speed search is usually carried out by displaying image data belonging to a plurality of different fields as one reproduced picture on a screen. More specifically, in the case where the processing of a signal is carried out on the basis of pixels and the shuffled pixels are recorded on and reproduced at a high speed from a track, the image data belonging to the plurality of fields are dispersed in the whole picture, so that unnatural discontinuity does not generate in the picture, and thus the picture can has good quality. Meanwhile, in the case where the data are recorded on the basis of blocks including the plurality of pixels and are reproduced at a high speed, blocks belonging to different fields may be adjacent to each other in the reproduced picture and a boundary between such small blocks is visually recognized. If a large number of small blocks belonging to different fields are reproduced in the minutely mixed manner, such boundaries are also generated minutely, resulting in the reproduced picture which appears as if a mosaic pattern processing has been applied. As a result, the quality of the reproduced picture in the high speed reproduction remarkably decreases.

SUMMARY OF THE INVENTION

Accordingly, it is an object of the invention to provide a digital recording and/or reproducing apparatus of a video signal, in which quality of a reproduced picture in an extraordinary speed reproduction is improved.

Another object of the invention is to provide a digital recording and/or reproducing apparatus of a video signal, which prevents a mosaic pattern in a picture reproduced by a high speed reproduction.

According to the invention, a digital recording apparatus for digitally recording a digital video signal includes a circuit for forming a plurality of blocks each including the digital video signal of a plurality of pixels, a circuit for encoding the digital video signal for each of the plurality of blocks, a circuit for controlling a code amount to be constant on the basis of one or more of the plurality of blocks to form a fixed length block, a circuit for encoding the fixed length blocks for error correction, which is to be made at the time of reproduction, and thereby forming error correction blocks, a circuit for rearranging the error correction blocks so that the error correction blocks included in the blocks, which are adjacent to each other on a screen, are adjacent to each other on a recording medium, the screen is horizontally and/or vertically divided into N (N is a positive integer) rectangular regions, and data for the N rectangular regions are recorded on N tracks, respectively, and a device for recording the rearranged error correction blocks on the recording medium.

According to another aspect of the present invention, an apparatus for reproducing digitally a digital video signal recorded as described above includes a device for detecting, at a changeable speed, error correction blocks recorded on a recording medium, a circuit for rearranging the detected error correction blocks into an original order which was established prior to recording, a circuit for reconstructing fixed length blocks, which were formed at the time of recording, by applying an error correction process to the rearranged error correction blocks and thereby correcting an error generated at the time of reproduction, a circuit for decoding the digital video signal for each of the blocks constituting the each reconstructed fixed length block, a circuit for concealing contents of each block to reduce the effect, which may be caused by an error, to a reproduced picture when the error correction circuit could not correct the error, and a circuit for restoring the arrangement of the decoded digital video signal correspondingly to the arrangement of the digital video signal, which was established at the time of recording, for each of said blocks constituting the fixed length block.

According to a further aspect of the present invention, an apparatus for digitally recording a supplied digital video signal and for digitally reproducing a recorded digital video signal includes a circuit for forming a plurality of blocks each including the digital video signal of a plurality of pixels, a circuit for encoding the digital video signal for each of the plurality of blocks, a circuit for controlling a code amount to be constant on the basis of one or more of the plurality of blocks to form a fixed length block, a circuit for encoding the fixed length blocks for error correction, which is to be made at the time of reproduction, and thereby forming error correction blocks, a circuit for rearranging the error correction blocks so that the error correction blocks included in the blocks, which are adjacent to each other on a screen, are adjacent to each other on a recording medium, the screen is horizontally and/or vertically divided into N (N is a positive integer) rectangular regions, and data for the N rectangular regions are recorded on N tracks, respectively, a device for recording the rearranged error correction blocks on the recording medium, a device for detecting, at a changeable speed, the error correction blocks recorded on the recording medium, a circuit for rearranging the detected error correction blocks into an original order which was established prior to recording, a circuit for reconstructing fixed length blocks, which were formed at the time of recording, by applying an error correction process to the rearranged error correction blocks and thereby correcting an error generated at the time of reproduction, a circuit for decoding the digital video signal for each of the blocks constituting the each reconstructed fixed length block, a circuit for concealing contents of each block to reduce the effect, which may be caused by an error, to a reproduced picture when the error correction circuit could not correct the error, and a circuit for restoring the arrangement of the decoded digital video signal correspondingly to the arrangement of the digital video signal, which was established at the time of recording, for each of the blocks constituting the each fixed length block.

As a main advantage, therefore, the present invention can prevent mosaic deformation of a picture reproduced at an extraordinary speed and thereby can achieve a high speed reproduced picture of good visual quality, because the error correction blocks are rearranged so that the error correction blocks included in the blocks, which are adjacent to each other on the screen, are adjacent to each other on the recording medium and the screen is divided into N (N is a positive integer) rectangular regions which are arranged in horizontal and/or vertical directions and the data for the respective rectangular regions are recorded on the N tracks, respectively.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
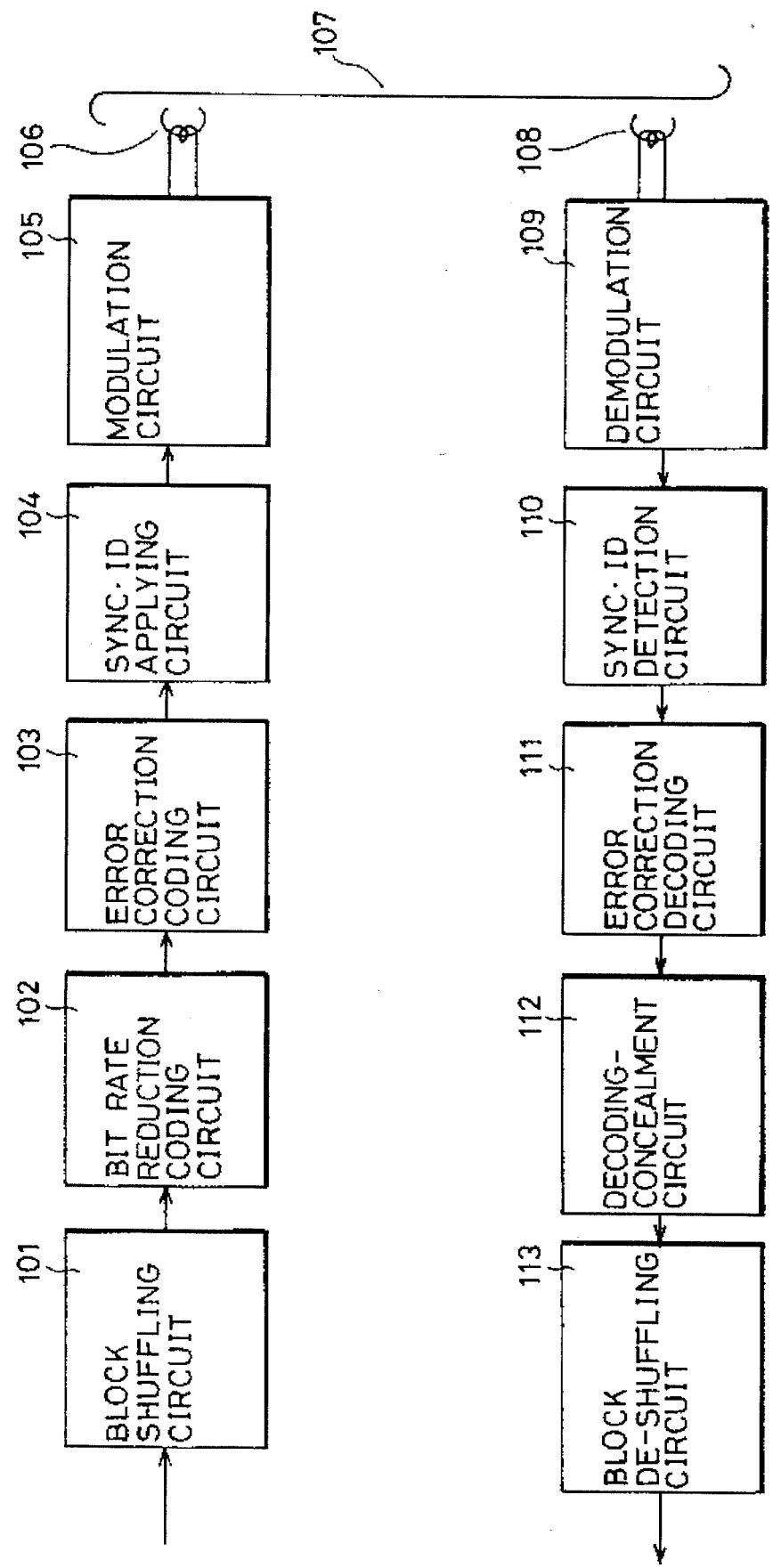
FIG. 1 is a block diagram schematically showing a structure of a conventional digital VCR.
Figure 2:
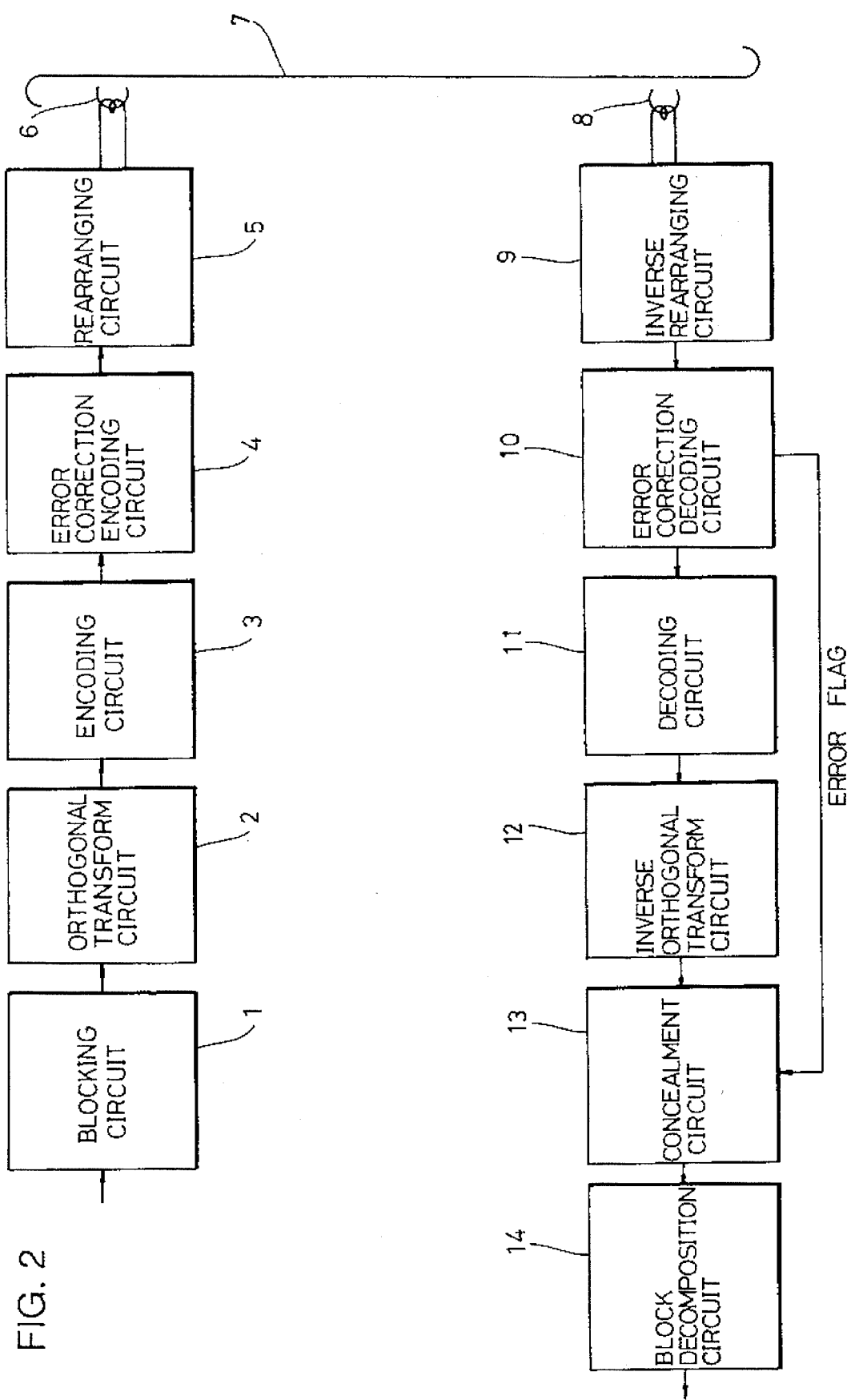
FIG. 2 is a block diagram schematically showing a structure of a digital VCR according to an embodiment of the present invention.

FIG. 2 is a block diagram schematically showing a structure of a digital VCR according to an embodiment of the present invention. Referring to FIG. 2, at the time of recording, a digital video signal provided from a video signal source not shown is supplied to a blocking circuit 1 included in a digital VCR. Similar to the prior art already described with reference to FIG. 1, the blocking circuit 1 combines a plurality of pixels in the horizontal and vertical directions of a digital video signal to form a plurality of rectangular units (blocks of data) not shown. The digital video signal of each block thus rearranged is supplied to an orthogonal transform circuit 2.

The orthogonal transform circuit 2 applies an orthogonal transform process to the entered digital video signal of each block using a well known method such as discrete cosine transform, and supplies the same to an encoding circuit 3. The encoding circuit 3 applies an encoding process to the digital video signal according to the amount of entered information of each block. More specifically, the encoding circuit 3 carries out control so that the code length has a fixed value for each block or for each plurality of blocks, whereby a data block of a fixed length is obtained. In the following description, it is assumed that the control of the code amount is carried out for each block to form the fixed length block.

The video signal provided from the encoding circuit 3 is supplied to an error correction encoding circuit 4 where an error correction code (parity) is added for correcting a possible error to be generated in a reproduction system. More specifically, the error correction encoding process is carried out using the well known Read-Solomon product codes including outer codes and inner codes, resulting-in a plurality of error correction blocks. In each error correction block, the above-described fixed length blocks are stored in one-to-one correspondence with inner codes.

The video signal of each block subjected to the error correction coding process is supplied to a rearranging circuit 5. The rearranging circuit 5 rearranges the blocks of data into an arrangement which will be described later. The blocks of data thus rearranged are modulated by a modulation circuit (not shown), and then are recorded on a magnetic tape 7 through magnetic heads 6 which are symbolized in the figure.

Figure 3:
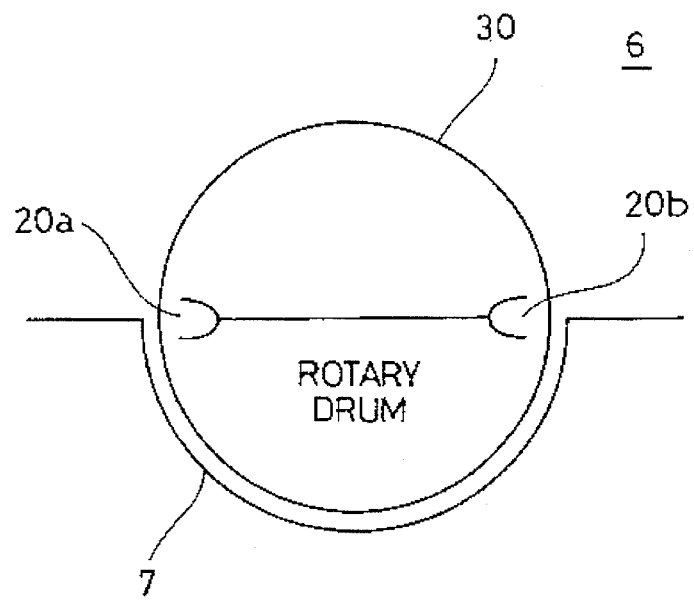
FIG. 3 schematically shows an arrangement of magnetic heads in a first embodiment of the invention.

FIG. 3 schematically shows an arrangement of the magnetic heads 6 in FIG. 2. In FIG. 3, the magnetic heads 6 include + azimuth head 20a and − azimuth head 20b mounted on a rotary drum 30, and the data for one picture on the screen is recorded on the magnetic tape 7 for every one and half rotation of the rotary drum 30. Thus, the data for one picture is recorded on the magnetic tape 7 while being divided into three tracks.

Figure 4:
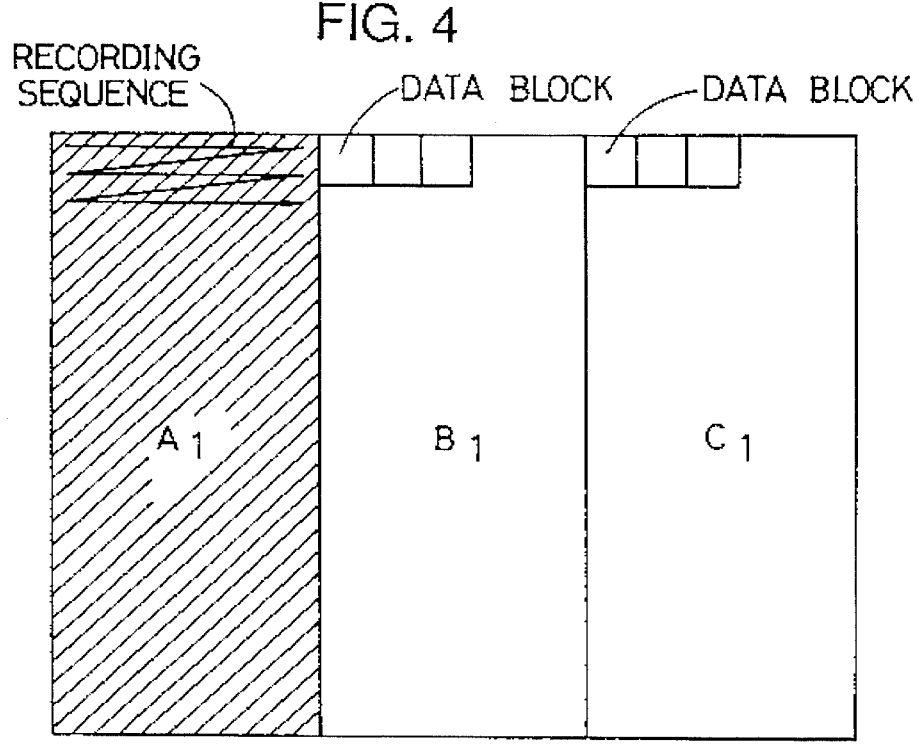
FIG. 4 schematically shows rectangular regions on a screen in the first embodiment of the invention.
Figure 5:
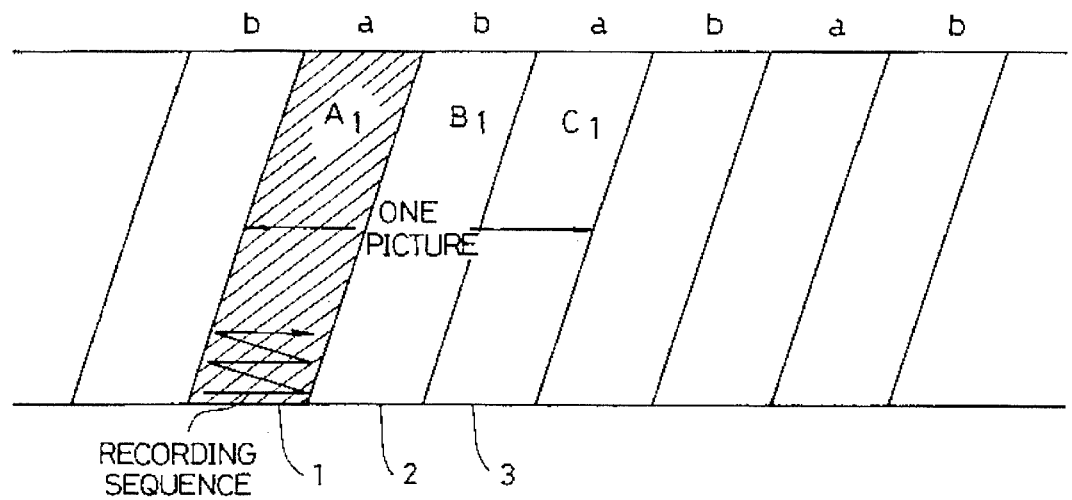
FIG. 5 schematically shows a data arrangement in tracks on a tape in a digital VCR according to the first embodiment of the invention.

In a first embodiment of the invention, which will be described below, the whole screen is equally divided into three rectangular regions A1, B1 and C1 aligned in the horizontal direction each of regions A1, B1, and C1 is formed by a plurality of the above described data blocks as shown in FIG. 4, and the video signal for each rectangular region is recorded in the corresponding track on the magnetic tape 7 by the corresponding magnetic head in accordance with the recording sequence indicated by an arrow, as shown in FIG. 5.

For example, the data of blocks for the left rectangular region A1 in FIG. 4 is recorded in a left track 1 among three tracks, which are used for recording the data for one picture and are defined between adjacent two solid lines in FIG. 5, by the magnetic head 20a during an initial half rotation of the rotary drum 30. The data of blocks for the middle rectangular region B1 in FIG. 4 is recorded in a middle track 2 in FIG. 5 by the magnetic head 20b during the next half rotation of the rotary drum 30. Thereafter, the data of blocks for the right rectangular region C1 in FIG. 4 is recorded in a right track 3 in FIG. 5 by the magnetic head 20a during the next half rotation of the rotary drum 30. As described above, the data of blocks which are adjacent to each other in the screen are recorded adjacently in each track.

At the time of reproduction, the recorded data on the tape 7 shown in FIG. 5 is reproduced via a magnetic head 8, and is demodulated by a demodulation circuit not shown. The demodulated video signal is supplied to an inverse rearranging circuit 9 where the blocks are rearranged to obtain the original arrangement of the plurality of error correction blocks.

The error correction blocks of the video signal which are rearranged by the inverse rearranging circuit 9 are supplied to an error correction decoding circuit 10. The error correction decoding circuit 10 applies error correction to the supplied video signal for correcting an error generated at the time of reproduction, whereby the original fixed length blocks are restored and supplied to a decoding circuit 11. The error correction decoding circuit 10 also applies an error flag to a block that could not be corrected, and provides the same to a concealment circuit 13.

The decoding circuit 11 decodes the coded data for each block, and applies the same to an inverse orthogonal transform circuit 12. The inverse orthogonal transform circuit 12 applies an orthogonal transform process, which is opposite to that at the time of recording, to the data for each block to obtain pixel data for each block and applied the same to the concealment circuit 13.

If the concealment circuit 13 has received the error flag from the error correction decoding circuit 10, the concealment circuit 13 replaces the pixel data of the block in question by pixel data of the block at the same position in a preceding picture.

The pixel data thus obtained for each block is supplied to a block decomposition circuit 14. The block decomposition circuit 14 decomposes the pixel data of each block to restore the arrangement of the digital video signal into the same form as that of the digital video signal supplied to blocking circuit 1 at the time of recording, and applies the same to a monitor device not shown. Thus, display of a reproduced image is possible.

Figure 6:
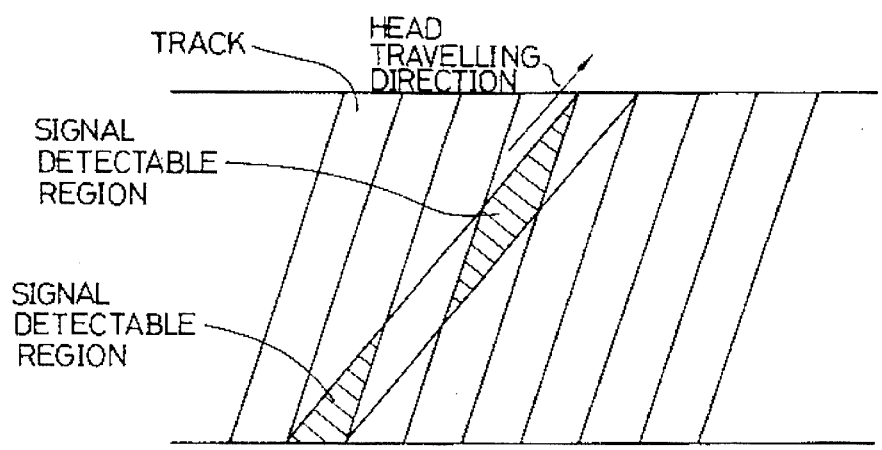
FIG. 6 schematically shows the relation between recording tracks formed on a tape by a digital VCR of the first embodiment of the invention and a trace of a head during a high speed reproduction.

FIG. 6 schematically shows the relation between recording tracks formed on the tape by the digital VCR of the above-described embodiment and a trace of the head in the high speed reproduction. At the time of high speed reproduction, the head for reproduction traverses and scans the plurality of record tracks formed on the tape, as shown in FIG. 6. By employing an azimuth recording method, one head can detect a video signal in every other track, as shown by the shaded line in FIG. 6. According to the present embodiment of the invention, data of blocks are recorded successively on each track, as described before, so that a signal can be detected with a certain continuity as such shown in FIG. 6 even at the time of high speed reproduction.

According to an embodiment of the present invention, the adjacent blocks in each record track contain the data of blocks located adjacent on a screen, so that the number of the blocks that could be detected successively on each record track (each of the shaded regions of FIG. 6) at the time of high speed reproduction is equal to the number of the blocks continuous on the screen. As a result, mosaic deformation on the screen at the time of high speed reproduction can be prevented to obtain a picture of good visual picture quality at the time of high speed reproduction.

Figure 7A:
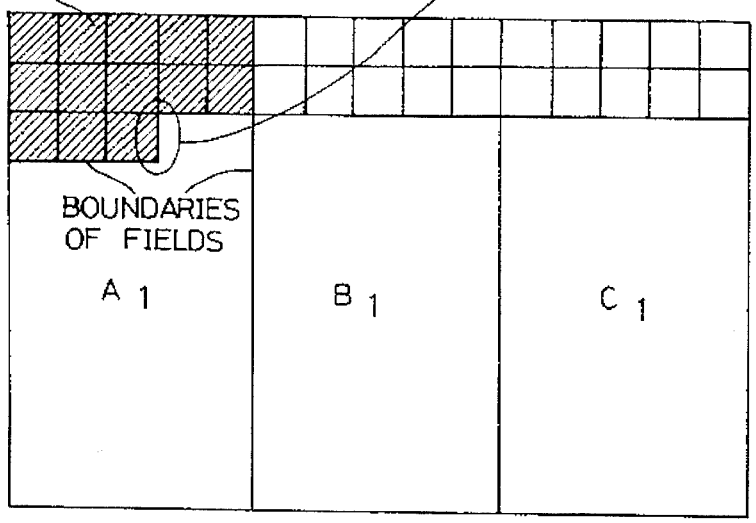
FIGS. 7A and 7B schematically show the effects of the first embodiment at the relatively low speed reproduction.
Figure 7B:
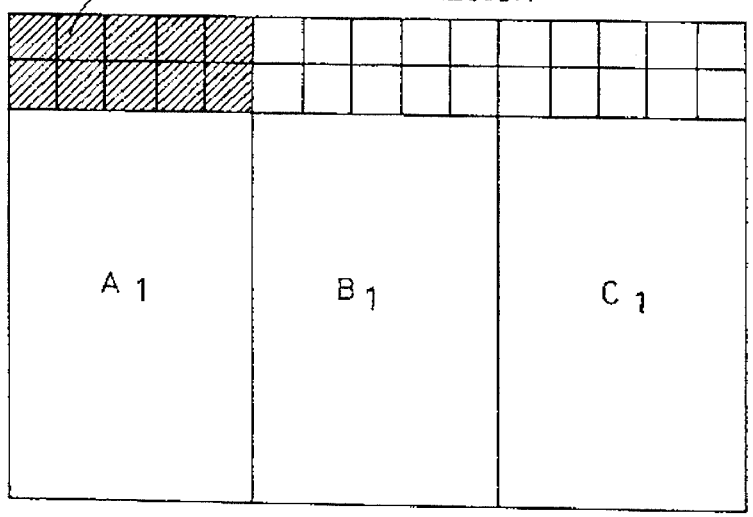

In the operation at the extraordinary reproduction speed of a relatively low value, it is determined whether the reproduction is allowed or not on the basis of blocks of the same number as that of horizontally aligned blocks in each of the rectangular regions. A1, B1 and C1 in FIG. 4. When an error is detected, the concealment processing described before is carried out. Thereby, boundaries in the vertical direction between different fields as shown in FIG. 7A are not generated in each rectangular region as shown in FIG. 7B, and mosaic deformation in the reproduced picture can be prevented, and a picture of good visual picture quality is obtained even in case of extraordinary reproduction speed.

Figure 8A:
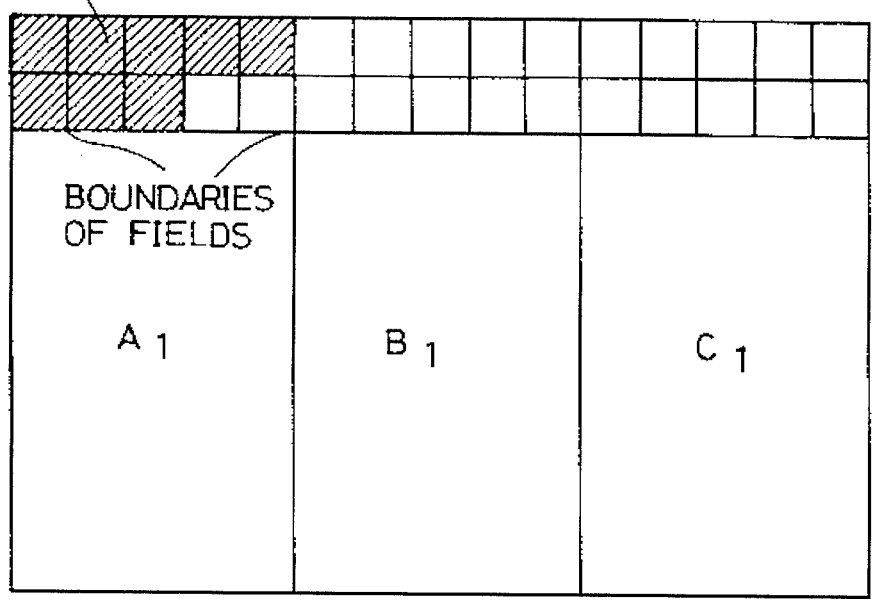
FIGS. 8A and 8B schematically show the effects of the first embodiment at the relatively high speed reproduction.
Figure 8B:
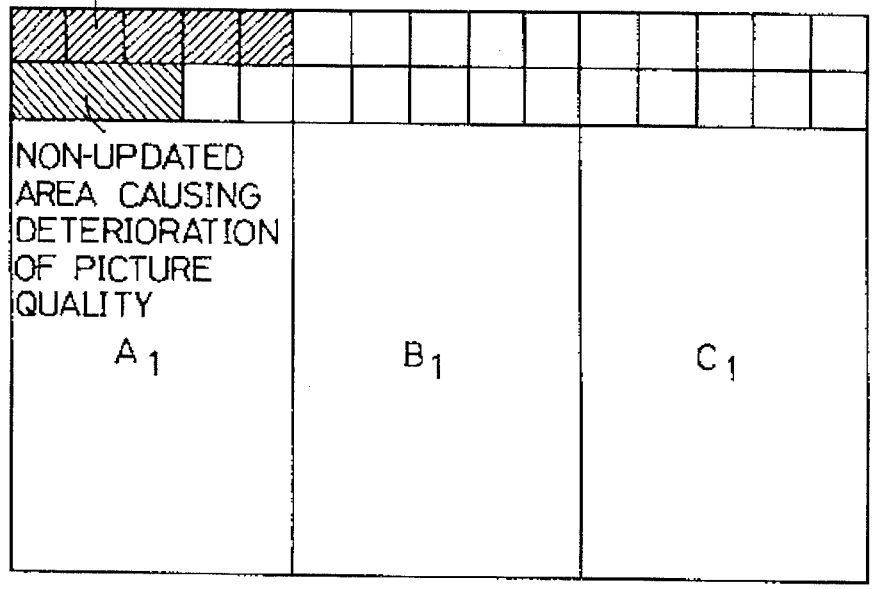

In the operation at the extraordinary reproduction speed of a relatively high value, the number of blocks which can be successively detected on each track is small. If it is determined whether the reproduction is allowed on the basis of a plurality of blocks as described above, in such a situation, the ratio of replacement of the picture by the reproduced new data in one field period, that is the, update ratio of the picture is reduced. As a result, old data remains in the picture as shown in FIGS. 8A and 8B, resulting in the deterioration of the picture quality. Therefore, it is determined whether or not the reproduction is allowed on the basis of each block as encoded in the recording operation described before. When an error is detected, the concealment processing described before is carried out. Thereby, the search at a higher speed is allowed, while increasing the update ratio of the picture and obtaining a picture of good visual picture quality.

The relationship between the speed for the extraordinary speed reproduction and the above described unit of data for the concealment processing is preferably changed in accordance with the number of blocks forming one complete picture and the number of tracks wherein data for one picture is recorded. For example, if the reproducing operation at the extraordinary speed may be carried out such that the number of blocks which can be successively detected on each track is less than double the number of the horizontally aligned blocks in each rectangular region in FIG. 4, the concealment processing may be carried out based on a determination of the possibility of the reproduction on the basis of each block as encoded in the recording operation.

The embodiment will be further described below in connection with a quadruple speed reproduction by the digital VCR, in which the number of the rectangular regions (A1, B1 and C1 in FIG. 4) is three and is equal to the number of the tracks (1, 2 and 3 in FIG. 5) on the tape as shown in FIGS. 4 and 5.

Figure 9:
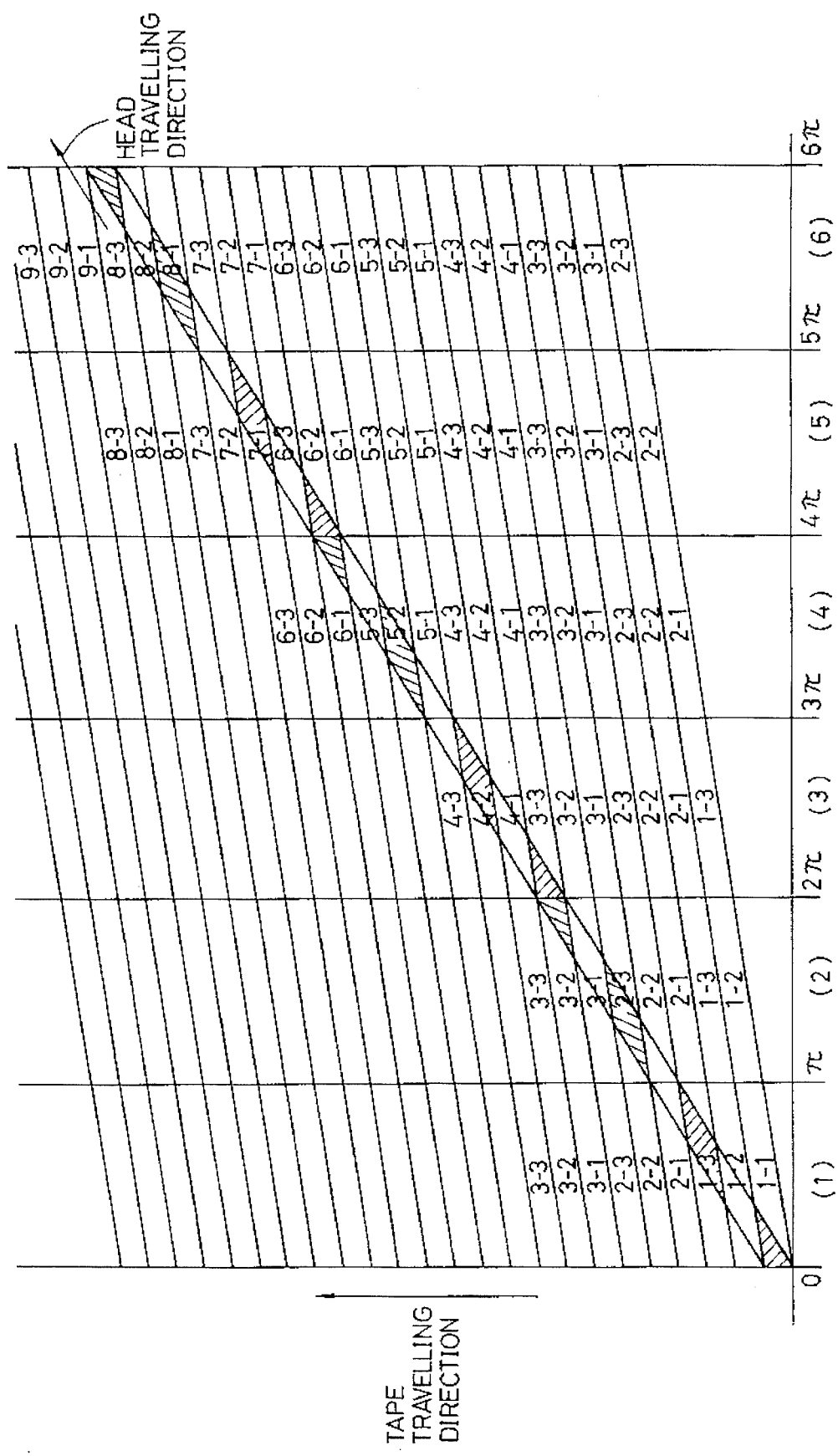
FIG. 9 schematically shows the relation between recording tracks formed on a tape and a trace of a head during a quadruple speed reproduction in the first embodiment of the invention.
Figure 10:
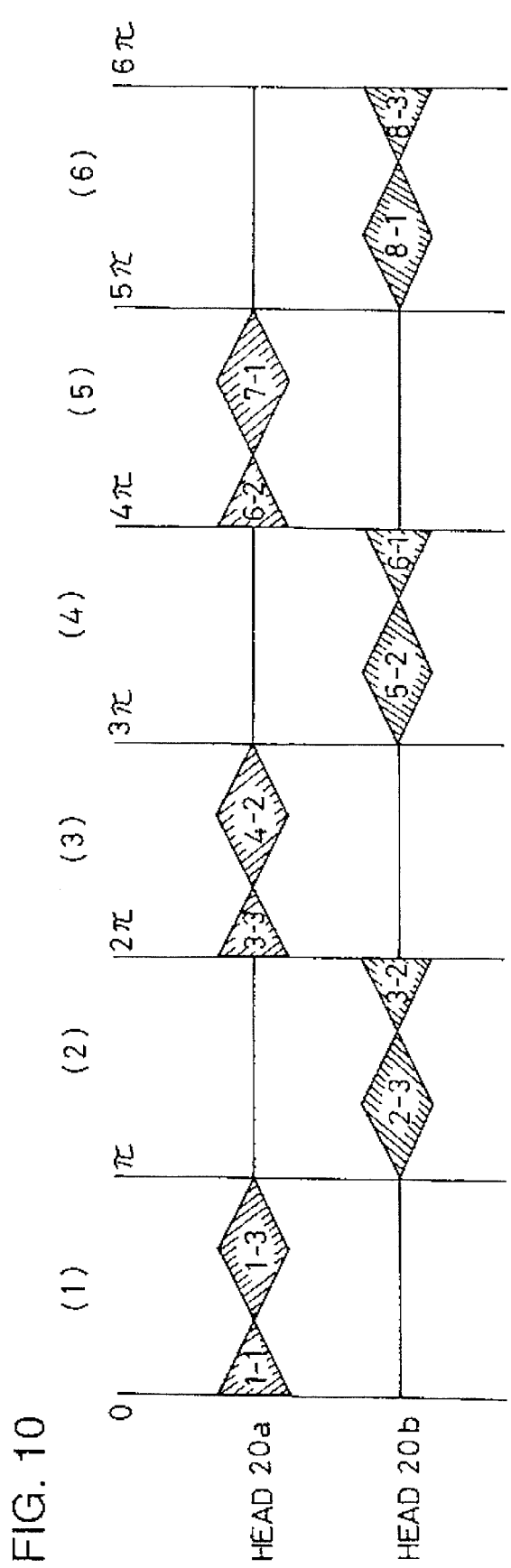
FIG. 10 is a waveform diagram showing reproduced signals supplied from heads in the first embodiment of the invention.

FIG. 9 schematically shows the relation between recording tracks and a trace of a head in the quadruple speed reproduction. In FIG. 9, the abscissa represents a rotational phase of the rotary head, and the ordinate represents a series of tracks along a travelling direction of the tape. Shaded portions in FIG. 9 represent regions in the respective tracks wherein signals can be reproduced, for example, the regions in which the level of the reproduced RF signal is 50% or more of the level in the normal reproduction in the present embodiment. The signal recorded in each track on the tape is specified by the combination of two numbers, i.e., the field number at the left of "-" and the track number at the right thereof. For example, "1-1" indicates the signal recorded at the first track of the first field and "3-2" indicates the signal recorded at the second track of the third field. FIG. 10 represents the levels of the reproduced signals from the heads 20a and 20b in the case shown in FIG. 9.

More specifically described with reference to FIGS. 9 and 10, during the initial half rotation of the rotary drum 30 (i.e., a period (1) from 0 to π), signals 1-1 and 1-3 are read from the shaded portions in the tracks 1 and 3 of the first field by the head 20a. Then, during the next half rotation of the rotary drum 30 (i.e., a period (2) from π to 2π), the signals 2-3 and 3-2 are read from the shaded portions in the track 3 of the second field and the track 2 of the third field by the head 20b, respectively. Thereafter, during the next half rotation of the rotary drum 30 (i.e., a period (3) from 2π to 3π), signals 3-3 and 4-2 are read from the shaded portions in the track 3 of the third field and the track 2 of the fourth field 2 by the head 20a, respectively. The signals will be read in a similar manner during periods (4), (5), (6), and so on.

Figure 11:
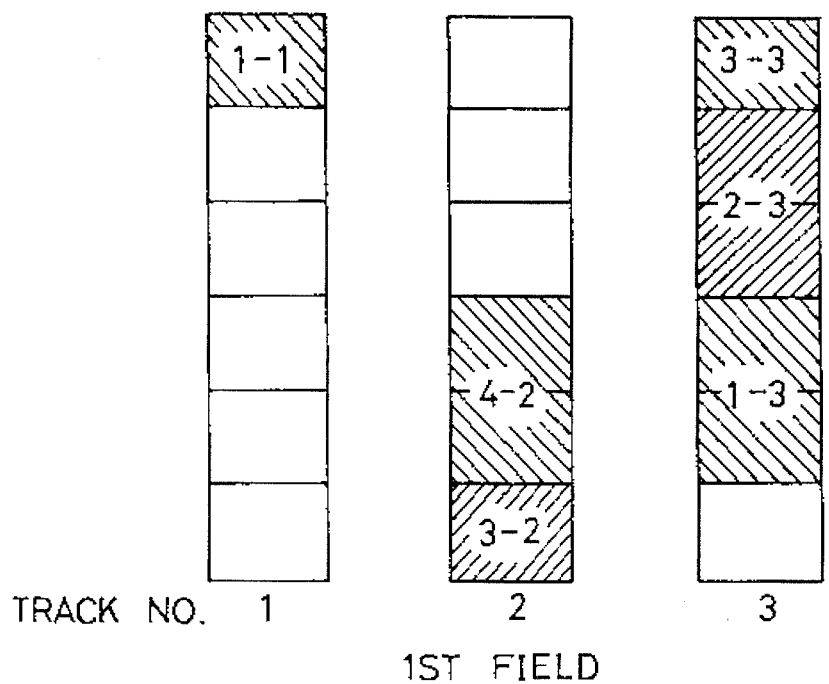
FIGS. 11 and 12 each schematically show signals forming respective rectangular regions in a reproduced picture in the first embodiment of the invention, respectively.

The reproduced picture of one field in the quadruple speed reproduction is formed of the recorded video signals belonging to four fields. FIG. 11 schematically shows reproduced images of the first field at the quadruple speed in the respective rectangular regions, which are formed by the signals reproduced during the periods (1)-(3) shown in FIGS. 9 and 10. In the rectangular region A1 corresponding to the left track 1, an uppermost ⅙ region is formed by the signal 1-1 read by the head 20a during the period (1). In the rectangular region B1 corresponding to the middle track 2, a lower ⅔ region is formed by the signal 4-2 read by the head 20a during the period (3), and a lowermost ⅙ region is formed by the signal 3-2 read by the head 20b during the period (2). In the rectangular region C1 corresponding to the right track 3, an uppermost ⅙ region is formed by the signal 3-3 read by the head 20a during the period (3), an upper ⅔ region is formed by the signal 2-3 read from the head 20b during the period (2), and the lower ⅔ region is formed by the signal 1-3 read by the head 20a during the period (1).

Figure 12:
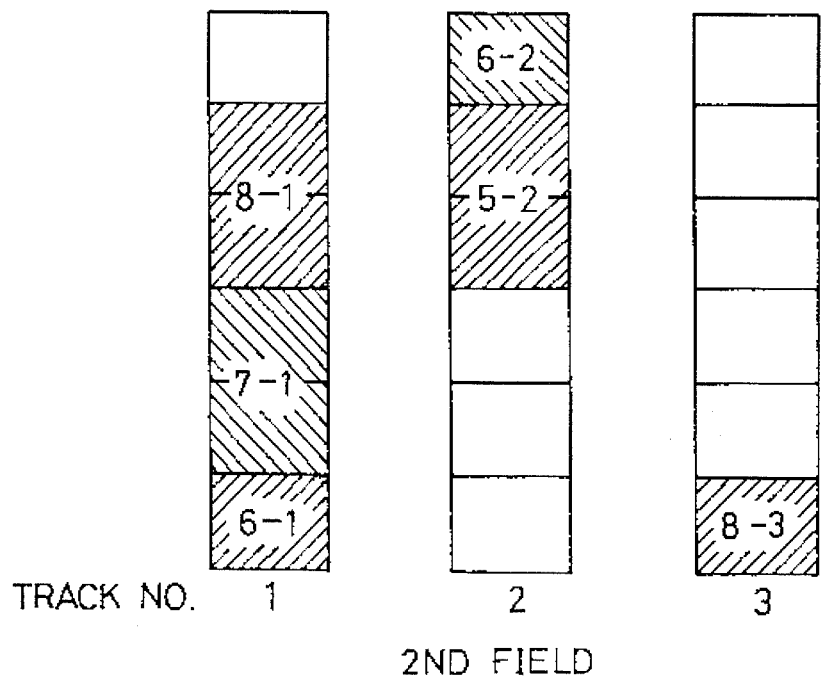

FIG. 12 schematically shows reproduced images of the second field at the quadruple speed in the respective rectangular regions, which are formed by the signals reproduced during the periods (4) and (5) shown in FIGS. 9 and 10. In the rectangular region A1 corresponding to the left track 1, an upper ⅔ region is formed by the signal 8-1 read by the head 20b during the period (6), a lower ⅔ region is formed by the signal 7-1 read by the head 20a during the period (5), and a lowermost ⅙ region is formed by the signal 6-1 read by the head 20b during the period (4). In the rectangular region B1 corresponding to the middle track 2, an uppermost ⅙ region is formed by the signal 6-2 read by the head 20a during the period (5), and an upper ⅔ region is formed by the signal 5-2 read by the head 20b during the period (4). In the rectangular region C1 corresponding to the right track 3, a lowermost ⅙ region is formed by the signal 8-3 read by the head 20b during the period (6).

Figure 13:
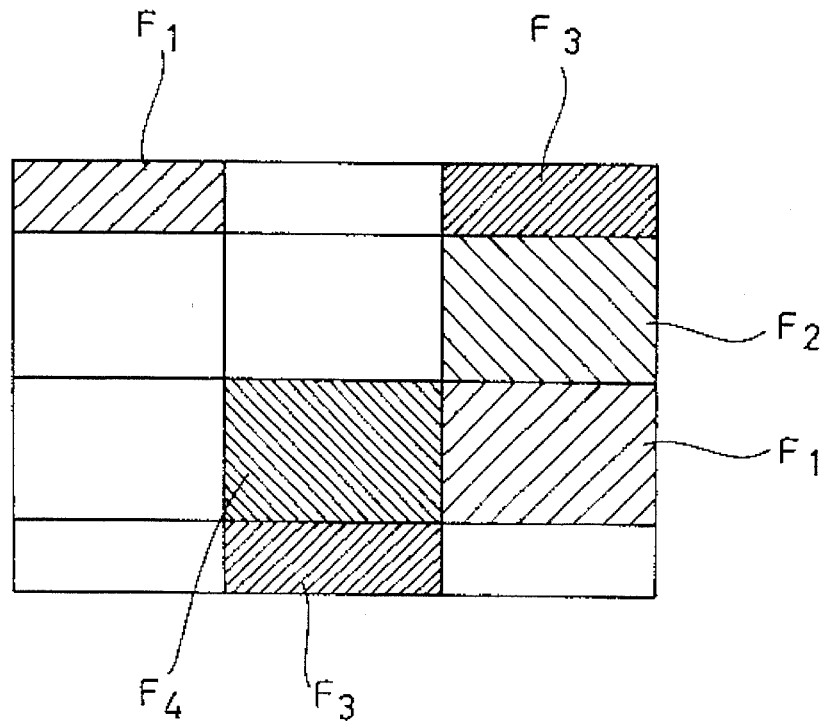
FIG. 13 schematically shows a reproduced picture obtained by composition of the signals in FIG. 11.

FIG. 13 is a schematic diagram showing the specific manner in which the picture of the first field obtained by the quadruple speed reproduction, which is formed by composition of the signals read for the respective regions, is constituted by the recorded video signals belonging to four fields F1–F4. In the first embodiment of the invention, the signals for the three rectangular regions A1, B1 and C1, which are formed by trisection of the screen with respect to the horizontal direction, are recorded on the corresponding tracks 1, 2 and 3, respectively. Therefore, the video signals belonging to the four fields F1–F4 are mixed as shown in FIG. 13, and horizontal boundaries between the fields are located at the same levels. Therefore, the mosaic deformation of the picture is prevented, and the picture can have excellent quality in the quadruple speed reproduction. On the other hand, a few vertical boundaries between fields may be generated along the boundary of each rectangular region. In case of relatively low speed reproduction, however, such boundaries are prevented from being generated in each rectangular region by determining the possibility of reproduction on the basis of a plurality of blocks as described above.

Figure 15:
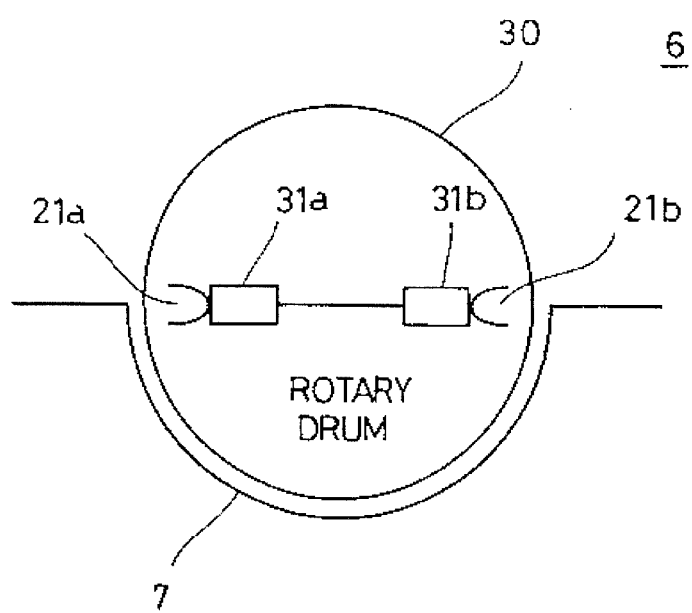
FIG. 15 schematically shows an arrangement of magnetic heads in a second embodiment of the invention.
Figure 14:
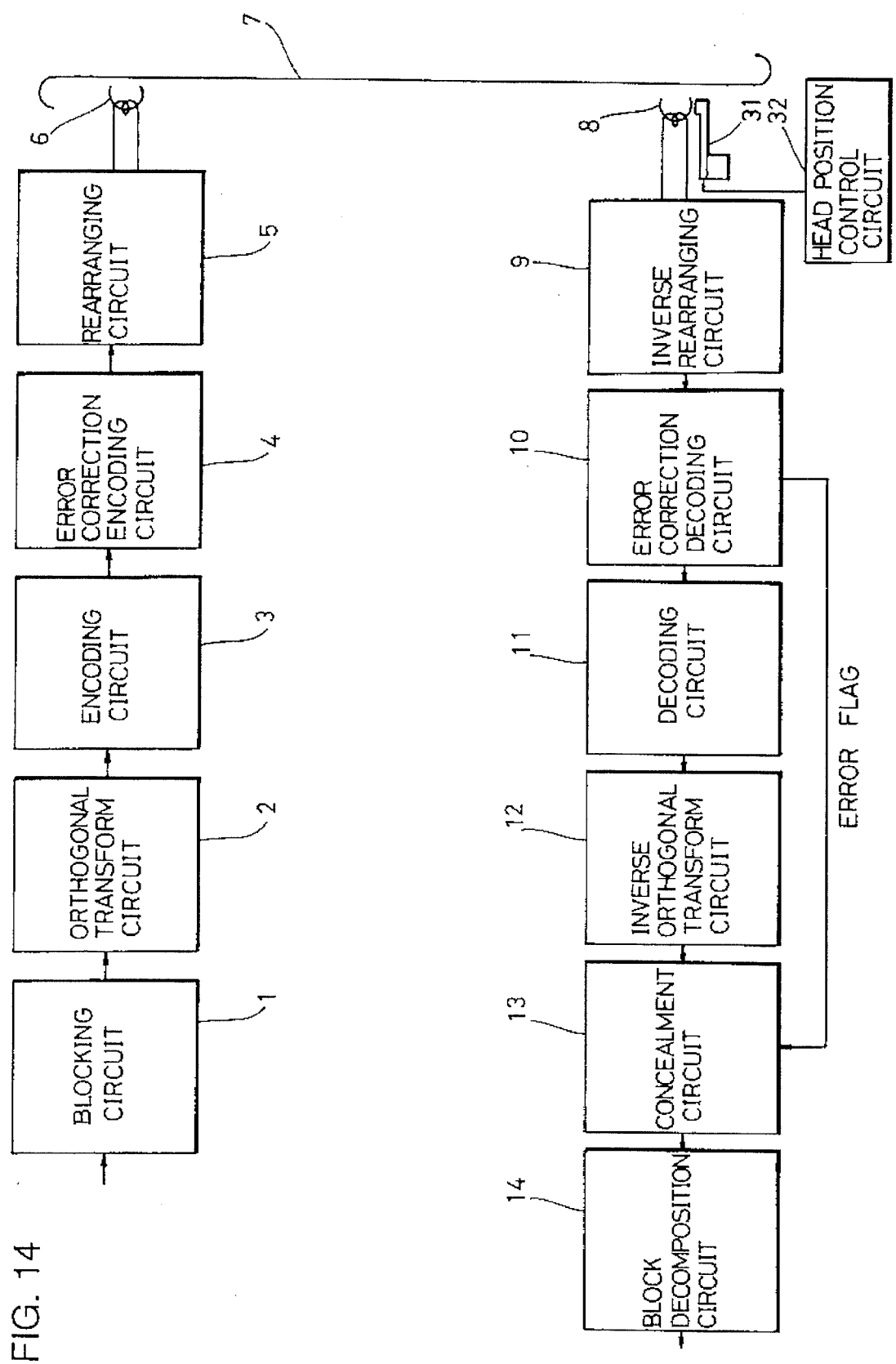
FIG. 14 is a block diagram schematically showing a structure of a digital VCR according to a second embodiment of the present invention.

FIG. 14 is a block diagram schematically showing a structure of a digital VCR according to a second embodiment of the present invention, and FIG. 15 schematically shows an arrangement of magnetic heads in this embodiment. The structure of the second embodiment shown in FIGS. 14 and 15 is basically the same as that of the first embodiment shown in FIGS. 2 and 3 except for the following points.

More specifically, heads 21a and 21b shown in FIG. 15 are movable heads which can be moved in the track width direction by means of head moving devices 31a and 31b such as moving coils, piezoelectric elements, and a control circuit 32 for controlling positions of the movable heads is provided as shown in FIG. 14. This control circuit 32 carries out dynamic track following (DTF) control for causing each movable head to follow tracks so as to obtain an envelope sufficient for reproduction. Since the present invention is not directed to the mechanism of DTF control itself, the detailed description thereof will be omitted. However, the DTF control of the moving coil type is described in Japanese Patent Publication No. 61-55173 and the DTF control of the piezoelectric element type is described in Japanese Patent Publication No. 62-55204.

Figure 16:
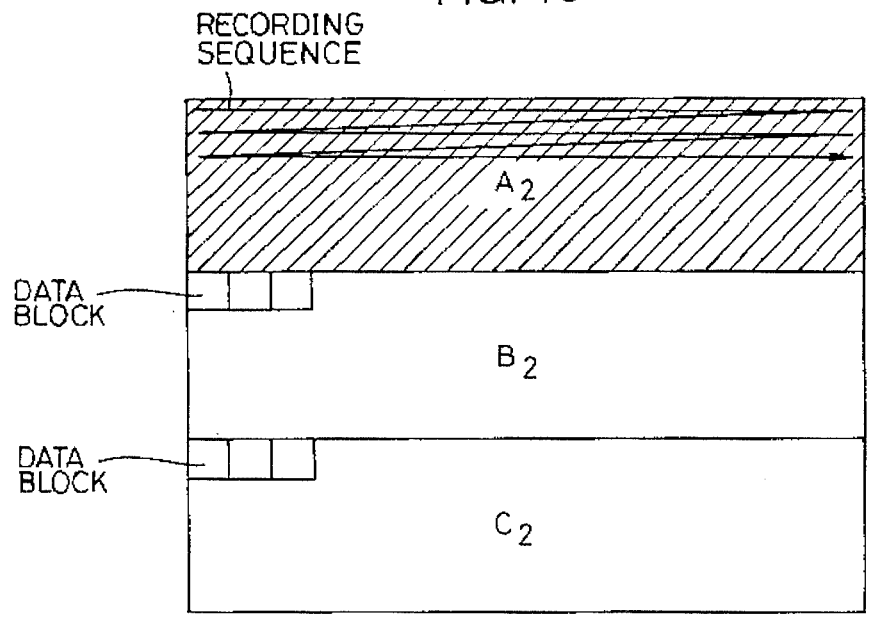
FIG. 16 schematically shows rectangular regions in a screen in the second embodiment of the invention.
Figure 17:
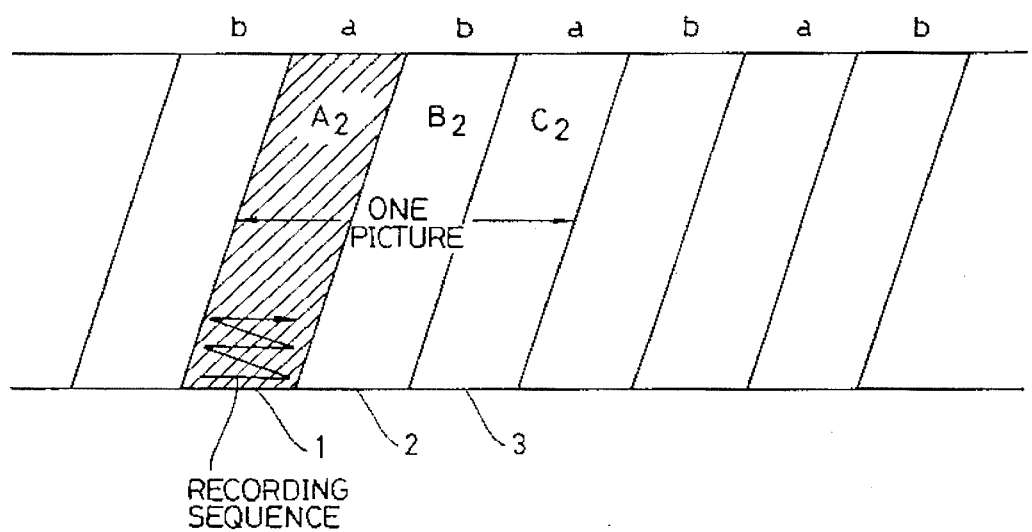
FIG. 17 schematically shows a data arrangement in tracks on a tape in a digital VCR according to the second embodiment of the invention.

While the horizontally aligned three rectangular regions A1, B1 and C1 are formed by the trisection of the screen in the foregoing first embodiment, as shown in FIG. 4, the screen in the second embodiment, which will be described below, is trisected into three rectangular regions A2, B2 and C3 with respect to the vertical direction, which are vertically aligned to each other, as shown in FIG. 16. Video signals for the respective regions are recorded by the corresponding magnetic heads in the corresponding tracks 1, 2 and 3 on the magnetic tape in accordance with the recording sequence indicated by an arrow in FIG. 17. For example, data for a plurality of blocks included in the uppermost rectangular region A2 in FIG. 16 is recorded by the magnetic head 21a in the left track 1 among the three tracks for one picture defined between solid lines in FIG. 17 during the initial half rotation of the rotary drum 30. The data of blocks included in the middle rectangular region B2 in FIG. 16 is recorded in the middle track 2 in FIG. 17 by the magnetic head 20b during the next half rotation of the rotary drum 30. The data of blocks included in the lowermost rectangular region C2 in FIG. 16 is recorded in the right track 3 in FIG. 17 by the magnetic head 21a during the next half rotation of the rotary drum 30. As described above, the data of blocks which are adjacent to each other on the screen are recorded adjacently in each track.

Figure 18:
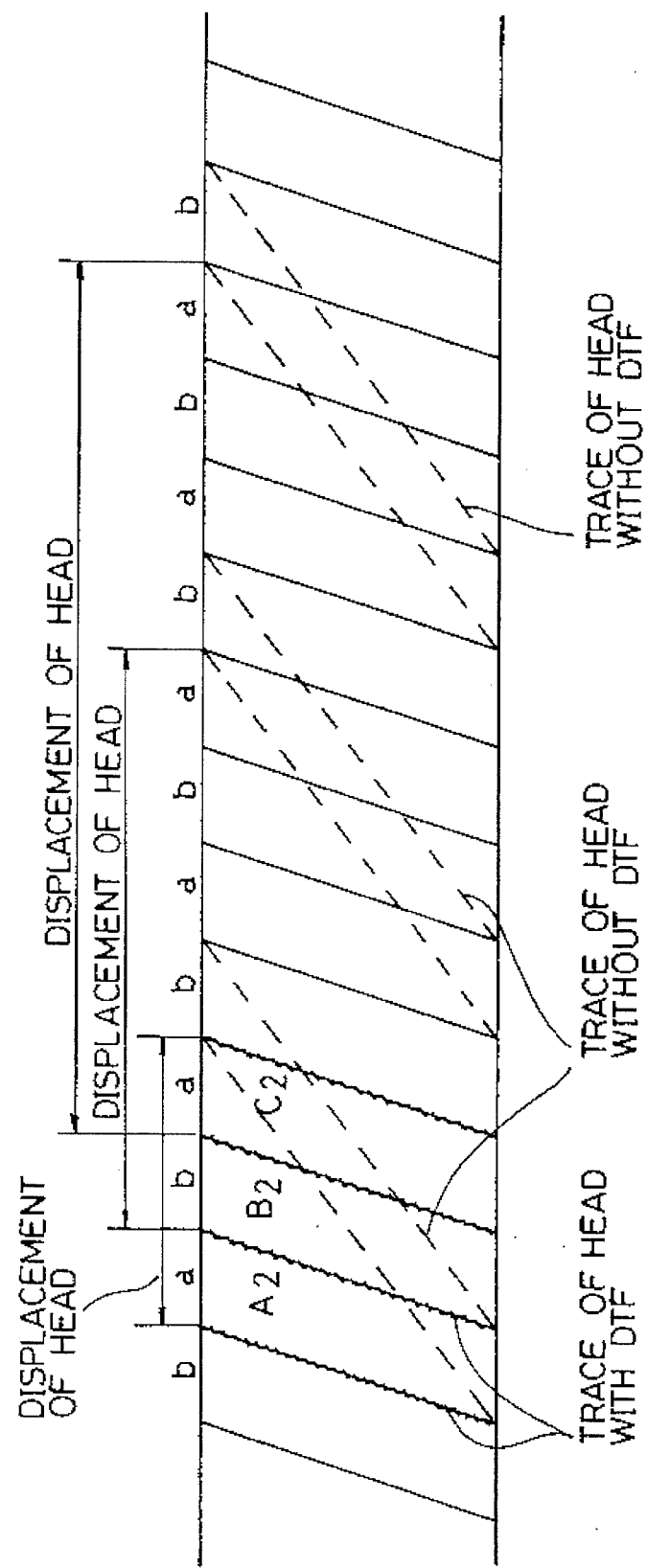
FIGS. 18 and 19 each schematically shows the relation between recording tracks formed on a tape by a digital VCR of the second embodiment of the invention and a trace of a head during a high speed reproduction.

Now, an operation of the second embodiment for the quadruple speed reproduction will be described below. If it is assumed that there is not any limit in displacements of the movable heads 21a and 21b, it is desirable to control the positions of the movable heads with displacements in three steps, as shown in FIG. 18 for the following reason.

More specifically, the triple speed reproduction by the DTF control will be considered in comparison with the quadruple speed reproduction without DTF control, that is, without moving the heads. Since the video signal data corresponding to one picture is recorded in the continuous three tracks such as A2, B2 and C2 in FIG. 18, the data corresponding to one picture belonging to the same field can be reproduced by DTF controlling each head to scan the continuous three tracks A2, B2 and C2 as the triple speed reproduction. Accordingly, the displacement of the head from the condition wherein the head is not moved becomes stepwise as shown in FIG. 18. Thus, in the case shown in FIG. 18, one picture to be reproduced is formed of the data belonging to the same field, so that it is not necessary to define the relationship between the positions of data on the tracks and the positions of data on the screen. For this reason, the above control is desirable.

Figure 19:
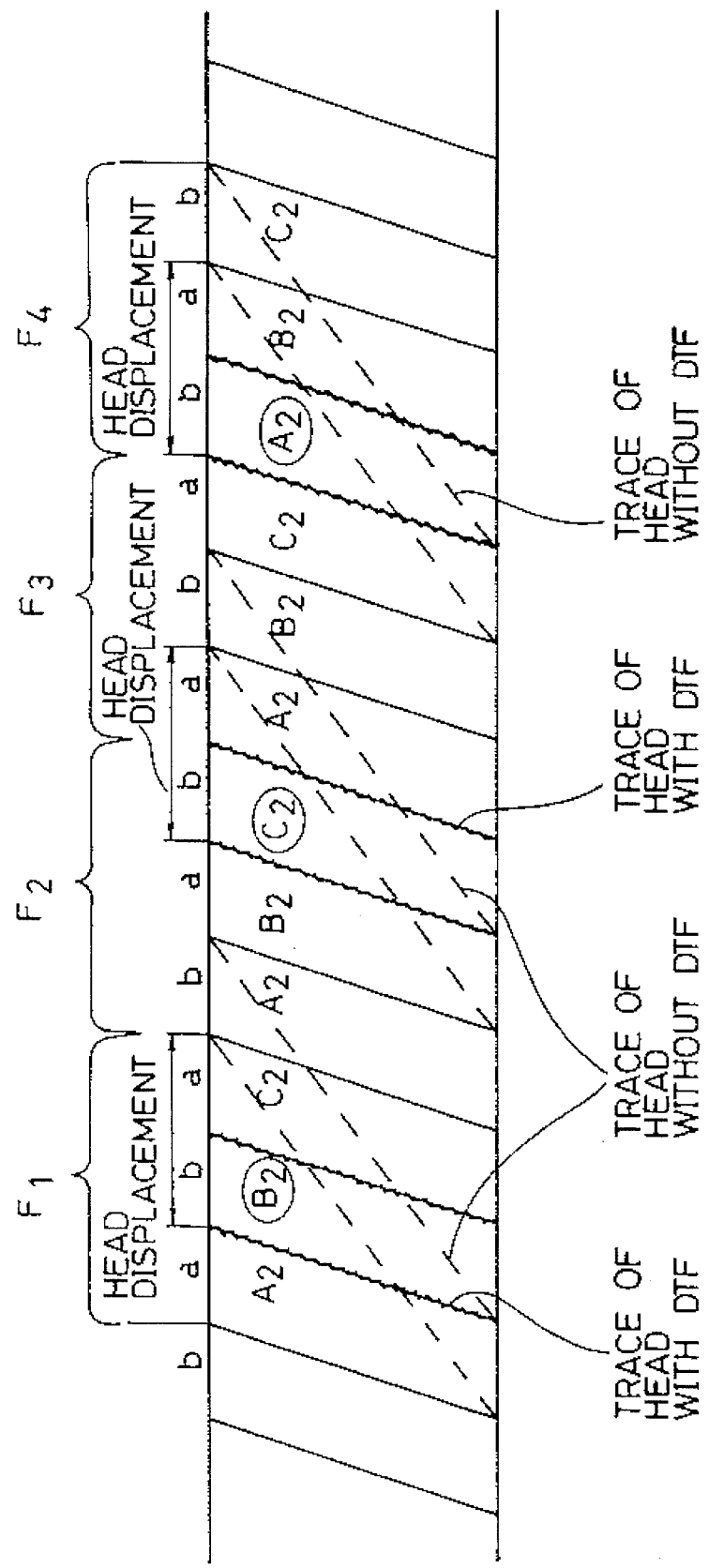
Figure 20:
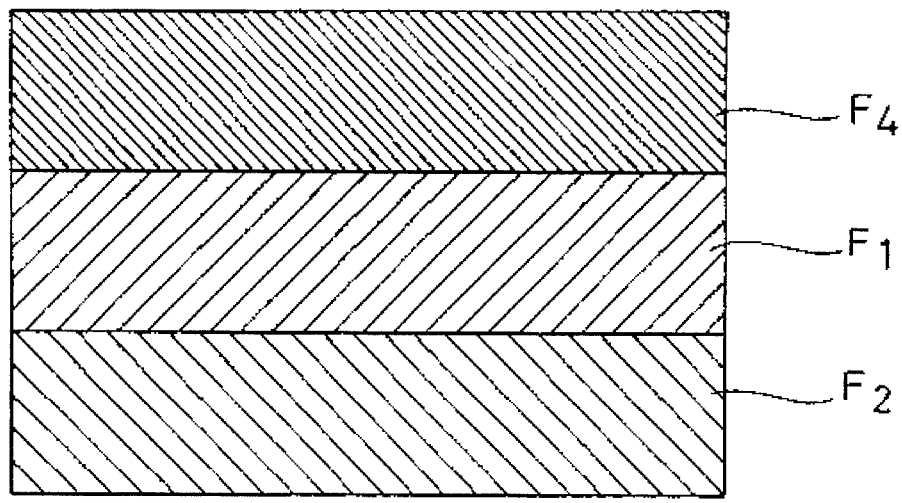
FIG. 20 schematically shows a reproduced picture in the high speed reproduction in the second embodiment of the invention.

In practice, however, there is a limit in the displacements of the movable heads. Generally, each head may be moved within the range of several 10μm with high accuracy and without any time delay. If it is assumed that such range is 50μm and track width is 10μm, for example, the limit of the head displacement will be 5tracks. Accordingly, reduction of the head displacement is desirable in view of mechanical loads on the heads. In the second embodiment, therefore, the positions of the movable heads are controlled as shown in FIG. 19. In this case, each of F1, F2, F3 and F4 in FIG. 19 indicates tracks wherein data of one picture is recorded, and more specifically, the data in the upper rectangular region A2 in FIG. 16 is recorded in the track A2 in FIG. 19, the data in the middle rectangular region B2 is recorded in the track B2, and the data in the lower rectangular region C2 is recorded in the track C2. If the heads are DTF controlled to scan the track B2 of F1, the track C2 of F2 and the track A2 of F4 as shown in FIG. 19 in such situation, the data belonging to the three fields F1, F2 and F4 are displayed in the quadruple speed reproduction at vertically aligned three regions, as shown in FIG. 20, resulting in excellent quality of the picture reproduced at the quadruple speed. In FIGS. 15 and 16, "DTF" indicates dynamic track following (i.e., dynamic tracking).

Figure 21:
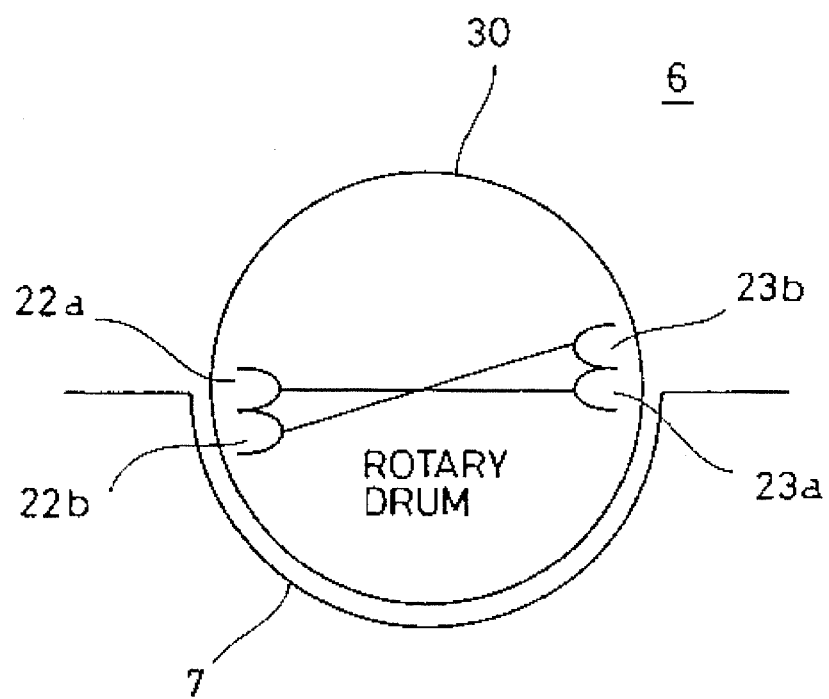
FIG. 21 schematically shows an arrangement of magnetic heads in a third embodiment of the invention.

FIG. 21 schematically shows an arrangement of magnetic heads in a digital VCR of a third embodiment of the invention. Although the first and second embodiments described before relate to the digital VCRs carrying out so-called "multisegment recording", the digital VCR of the third embodiment carries out multichannel recording in addition to multisegment recording of the first and second embodiments. In the following description, it is assumed that, for the sake of simplification, four heads shown in FIG. 21 are used to record digital video signal data for one picture in eight tracks in a divided form.

Figure 22:
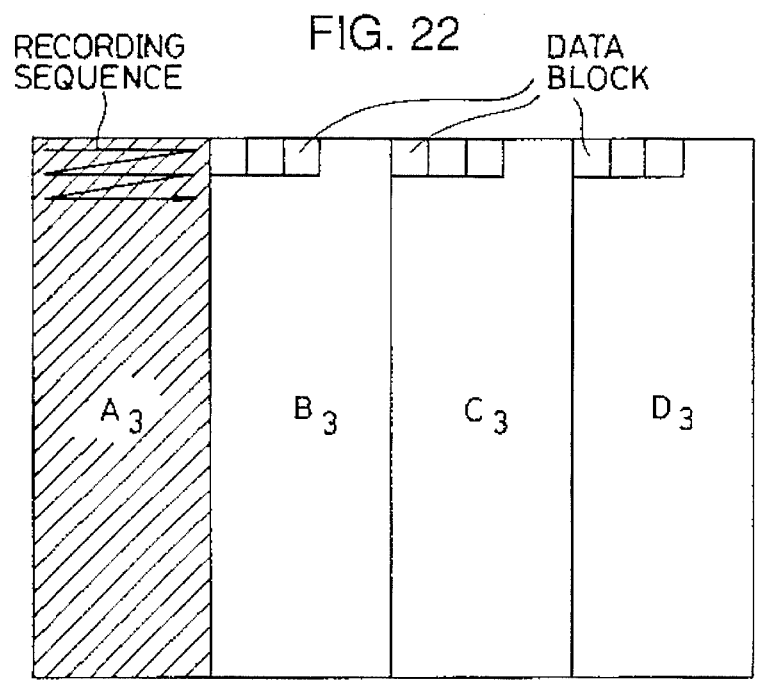
FIG. 22 schematically shows the manner of setting rectangular regions in a screen in the third embodiment of the invention.
Figure 23:
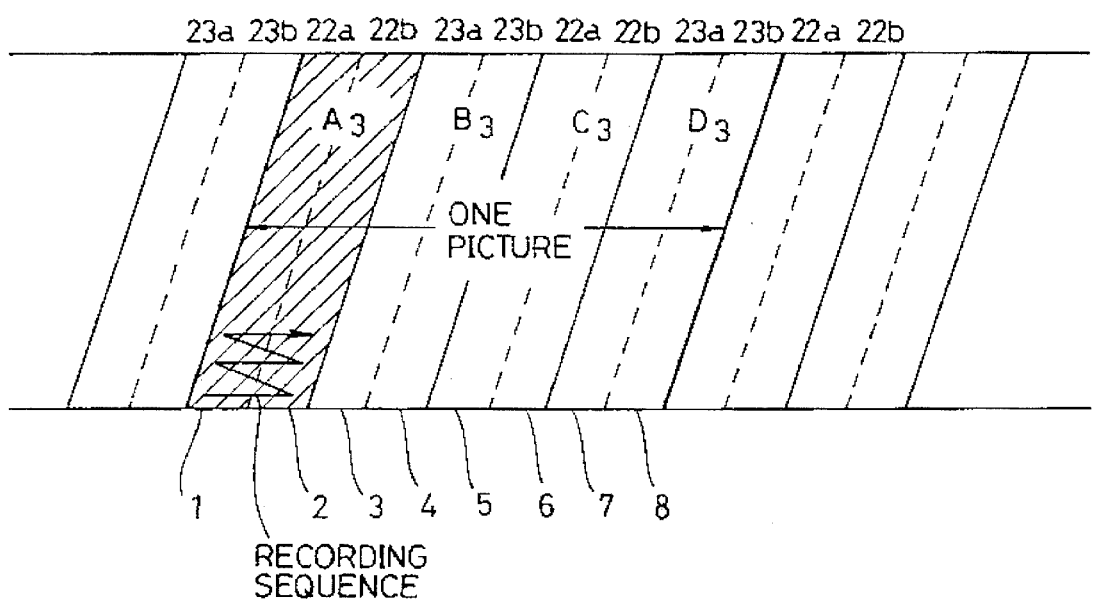
FIG. 23 schematically shows a data arrangement in tracks on a tape by a digital VCR according to the third embodiment of the invention.

Referring to FIG. 21, heads 22a and 23a are + azimuth heads, and heads 22b and 23b are − azimuth heads. With the pair of heads 22a and 22b and the pair of heads 23a and 23b, the data for one picture is recorded in the eight tracks on the tape using the two pairs, i.e., a total of four heads, by two rotations of the rotary drum 30 in FIG. 21. FIGS. 22 and 23 show the manner where data for one picture is recorded in the eight tracks using the four heads.

In the third embodiment of the invention, which will be described below, the screen is quartered into rectangular regions A3, B3, C3 and D3 with respect to the horizontal direction, as shown in FIG. 22. The video signal in each region is recorded in the corresponding track pair on the magnetic tape by the corresponding pair of heads in accordance with the recording sequence indicated by an arrow in FIG. 23. For this purpose, the rearranging circuit 5 (FIG. 2) rearranges the data in such manner. More specifically, as shown in FIG. 23, a region defined between thick solid lines is a region wherein the data for one picture is recorded. Four regions quartered and defined by thin solid lines are regions formed by the head pair 22a and 22b and head pair 23a and 23b. Each region defined by dotted lines corresponds to the track formed by the single head.

For example, the data of blocks for the left rectangular region A3 in FIG. 22 is recorded in the track pair (tracks 1 and 2) at the left end among the four track pairs for one picture shown in FIG. 23 by the magnetic head pair 22a and 22b during the initial half rotation of the rotary drum 30. The data of blocks for the left rectangular region B3 in FIG. 22 is recorded in the left track pair (tracks 3 and 4) among the four track pairs shown in FIG. 23 by the magnetic head pair 23a and 23b during the next half rotation of the rotary drum 30. Then, the data of blocks for the right rectangular region C3 in FIG. 22 is recorded in the right track pair (tracks 5 and 6) among the four track pairs shown in FIG. 23 by the magnetic head pair 22a and 22b during the next half rotation of the rotary drum 30. Thereafter, the data of blocks for the rectangular region D3 at the right end in FIG. 22 is recorded in the track pair (tracks 7 and 8) at the right end among the four track pairs shown in FIG. 23 by the magnetic head pair 23a and 23b during the next half rotation of the rotary drum 30. In this manner, the data of blocks which are adjacent to each other in the screen are recorded adjacently in each track pairs, and the data for rectangular regions formed by quartering the screen into four are recorded in a divided forms on the corresponding track pairs.

Figure 24:
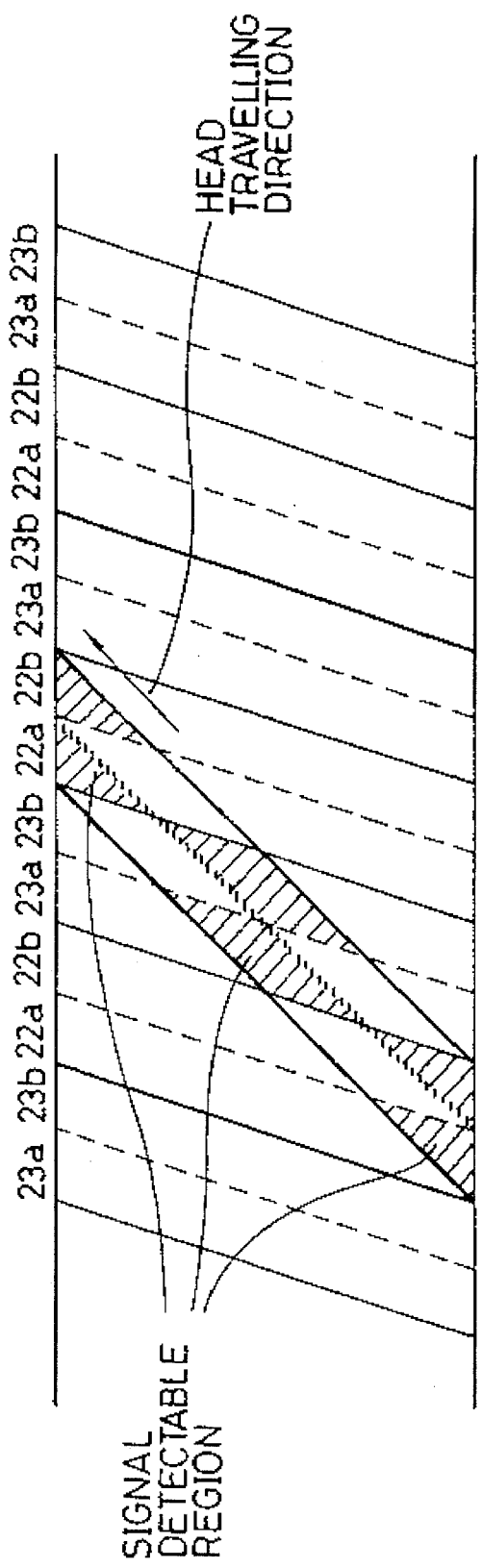
FIG. 24 schematically shows the relation between recording tracks formed on a tape by a digital VCR of the third embodiment of the invention and a trace of a head during a high speed reproduction.

FIG. 24 schematically shows the relation between the recording tracks formed on the tape by the digital VCR of the third embodiment of the invention and the trace of the head during the high speed reproduction. At the time of high speed reproduction, the head pair for reproduction traverses and scans the plurality of record track pairs formed on the tape, as shown in FIG. 24. By employing the azimuth recording method, the video signal is detected from the regions shown by the shaded lines in FIG. 24. According to the third embodiment, the substantially same regions in the two tracks forming the pair are scanned by the head pair. Therefore, by rearranging the data so that the blocks which are adjacent to each other on the screen are alternately disposed on the paired tracks, double the number of blocks which are adjacent to each other on the screen as compared with one head can be successively detected Thereby, the blocks which are successively reproduced on the screen can be double in number, compared with the case not employing the multichannel recording described before. As a result, mosaic deformation of the picture at the time of high speed reproduction can be prevented more reliably, and thus a picture of high visual picture quality can be obtained at the time of high speed reproduction.

Then, an operation of the digital VCR will be described below in connection with a triple speed reproduction, in which the number of the rectangular regions (A3, B3, C3 and D3 in FIG. 22) in the screen is four and is equal to the number of the track pairs (tracks 1 and 2, 3 and 4, 5 and 6, and 7 and 8 in FIG. 20) on the tape, as shown in FIGS. 22 and 23.

Figure 25:
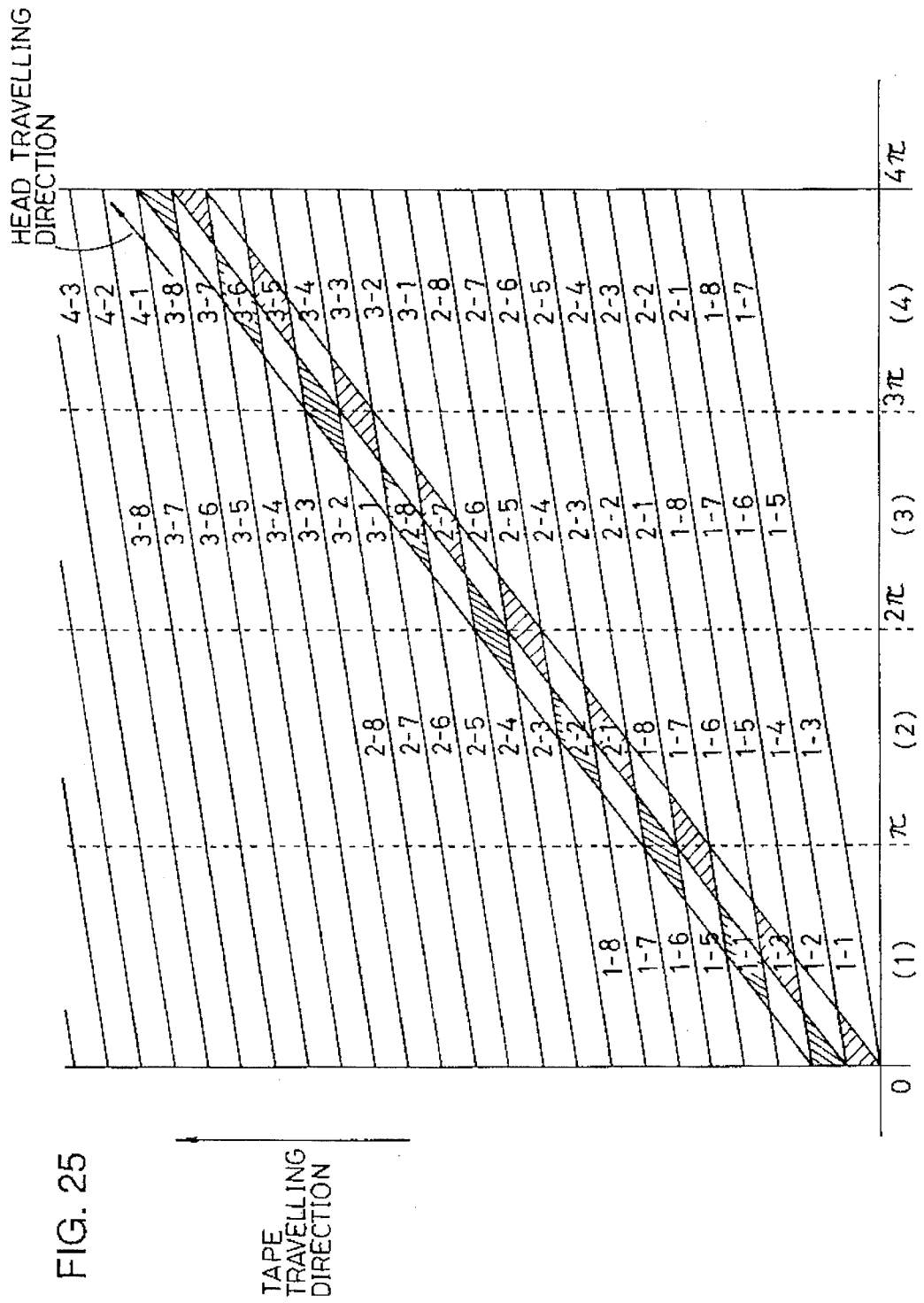
FIG. 25 schematically shows the relation between recording tracks formed on a tape by a digital VCR in the third embodiment of the invention and a trace of a head during a triple speed reproduction.
Figure 26:
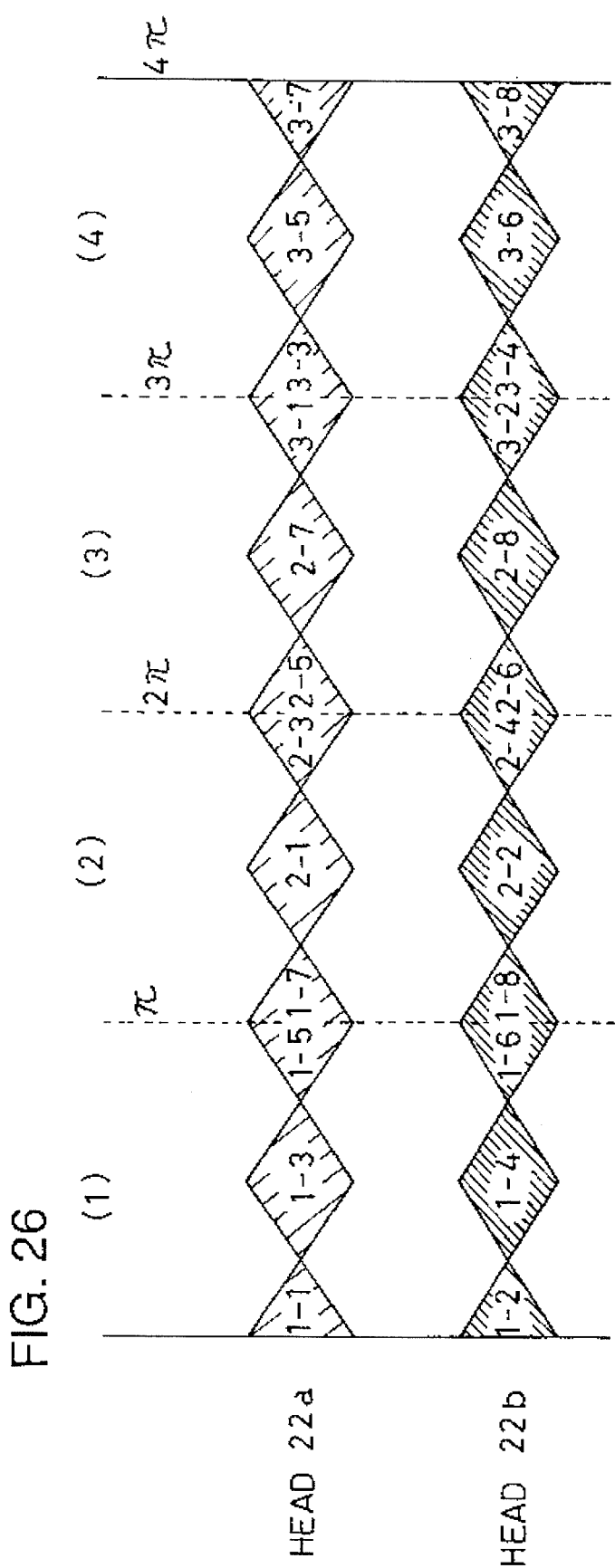
FIG. 26 is a waveform diagram showing reproduced signals supplied from heads in the third embodiment of the invention.

FIG. 25 schematically shows the relation between recording tracks and a trace of the head in the triple speed reproduction. In FIG. 25, the abscissa represents a rotational phase of the rotary head, and the ordinate represents a series of tracks along the travelling direction of the tape. Shaded portions in FIG. 25 represent regions in the respective tracks which can be reproduced, for example, the regions in which the level of the reproduced RF signal is 50% or more of the level in the normal reproduction in the present embodiment. The signal recorded in each track on the tape is specified by the combination of the numbers, i.e., the field number at the left of "-" and the track number at the right thereof. FIG. 26 represents the levels of the signals reproduced through the heads 22a (or 23a) and 22b (or 23b) in FIG. 21.

More specifically, as shown in FIGS. 25 and 26, during the initial half rotation of the rotary drum 30 (i.e., a period (1) from 0 to π), signals 1-1, 1-2, 1-3, 1-4, 1-5 and 1-6 are read from the shaded portions in the tracks 1-6 of the first field by the heads 22 and 22b. Then, during the next half rotation of the rotary drum 30 (i.e., a period (2) from π to 2π), the signals 1-7, 1-8, 2-1, 2-2, 2-3 and 2-4 are read by the heads 22a and 22b from the shaded portions in tracks 7 of the first field through 4 of the second field. Thereafter, during the next half rotation of the rotary drum 30 (i.e., a period (3) from 2π to 3π), signals 2-5, 2-6, 2-7, 2-8, 3-1 and 3-2 are read by the heads 22a and 22b from the shaded portions in tracks 5 of the second field through 2 of the third field. Thereafter, during the next half rotation of the rotary drum 30 (i.e., a period (4) from 3π to 4π), signals 3-3, 3-4, 3-5, 3-6, 3-7 and 3-8 are read by the heads 22a and 22b from the shaded portions in tracks 3-8 of the third field.

Figure 27:
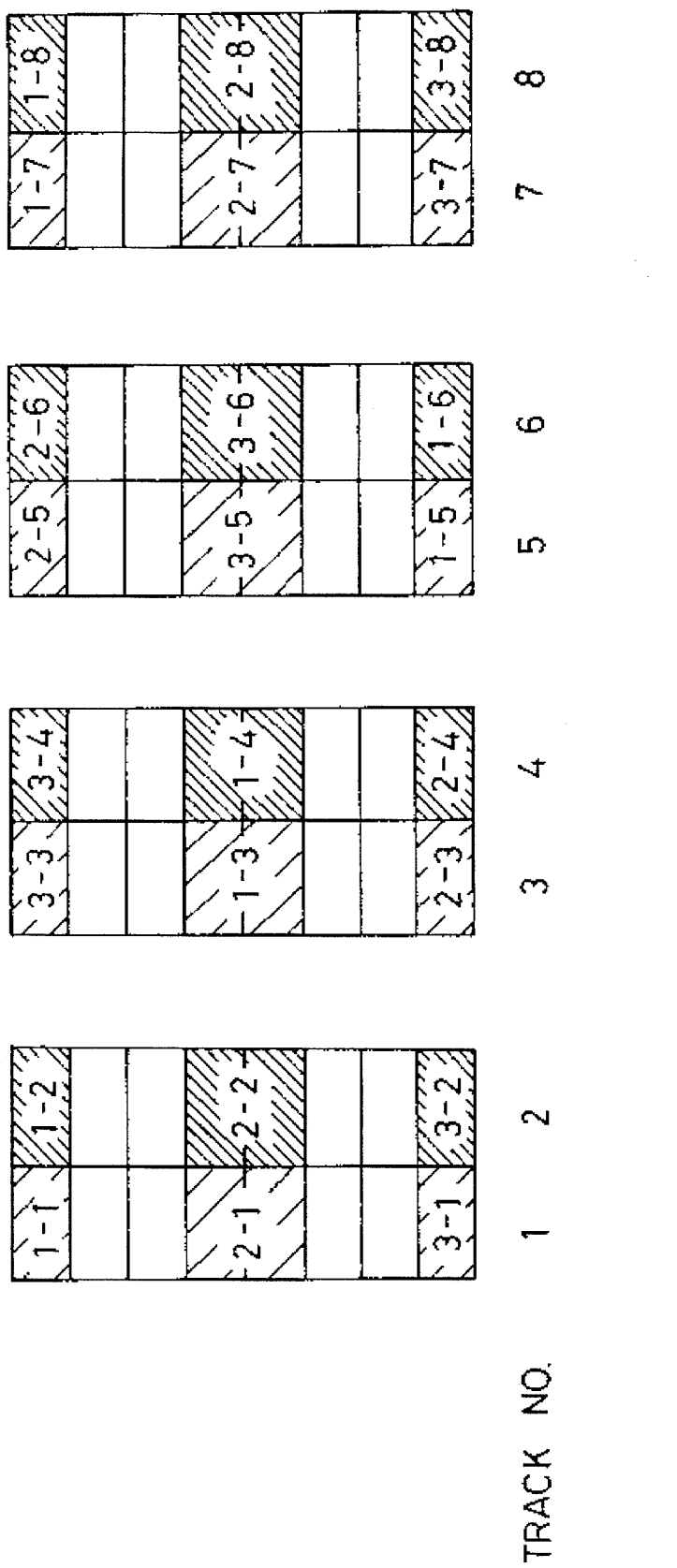
FIG. 27 schematically shows signals forming respective rectangular regions in a reproduced picture in the third embodiment of the invention.

The reproduced picture of one field in the triple speed reproduction is formed of the recorded video signals belonging to three fields. FIG. 27 schematically shows reproduced pictures of the first field, which are reproduced at the triple speed reproduction and are formed of the signals reproduced during the periods (1)–(4) shown in FIGS. 25 and 26. In the rectangular region A1 corresponding to the tracks 1 and 2, the shaded regions are formed by the signals 1-1, 1-2, 2-1, 2-2, 3-1 and 3-2 read by the heads 22a and 22b during the periods (1)–(3). In the rectangular region B3 corresponding to the tracks 3 and 4, the shaded regions are formed by the signals 1-3, 1-4, 2-3, 2-4, 3-3 and 3-4 read by the heads 22a and 22b during the periods (1), (2) and (4). In the rectangular region C3 corresponding to the tracks 5 and 6, the shaded regions are formed by the signals 1-5, 1-6, 2-5, 2-6, 3-5 and 3-6 read by the heads 22a and 22b during the periods (1), (3) and (4). In the rectangular region D3 corresponding to the tracks 7 and 8, the shaded regions are formed by the signals 1-7, 1-8, 2-7, 2-8, 3-7 and 3-8 read by the heads 22a and 22b during the periods (2), (3) and (4).

Figure 28:
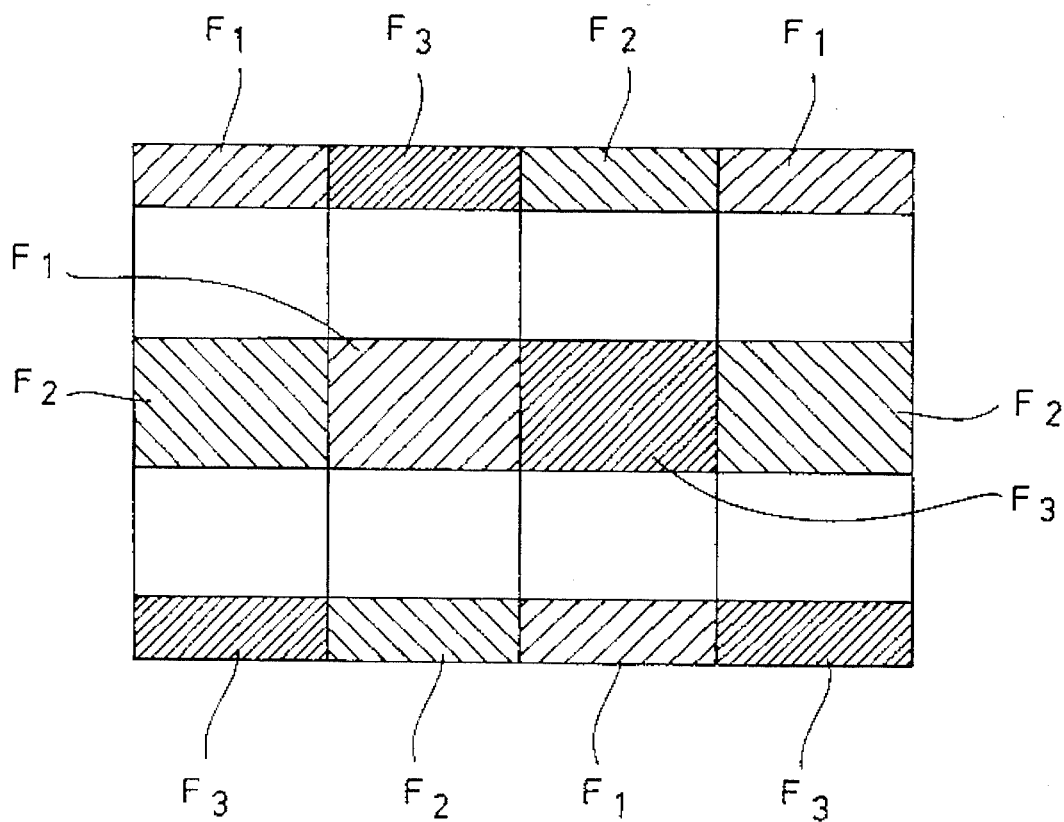
FIG. 28 schematically shows a reproduced picture obtained by composition of the signals in FIG. 27.

FIG. 28 is a schematic diagram in which the picture of the first field, which is obtained by the triple speed reproduction and is formed by composition of the signals read for the respective regions, as shown in FIG. 27, is formed by the video signals belonging to recorded three fields F1–F3. In the third embodiment of the invention, the signals for the four rectangular regions, which are formed by quartering the screen with respect to the horizontal direction, are recorded on the corresponding track pairs, respectively. Therefore, the three fields F1 –F3 are mixed as shown in FIG. 28, and horizontal boundaries between the fields are located at the same levels. Therefore, the mosaic deformation of the picture is prevented, and the picture can have an excellent quality in the triple speed reproduction.

Figure 29:
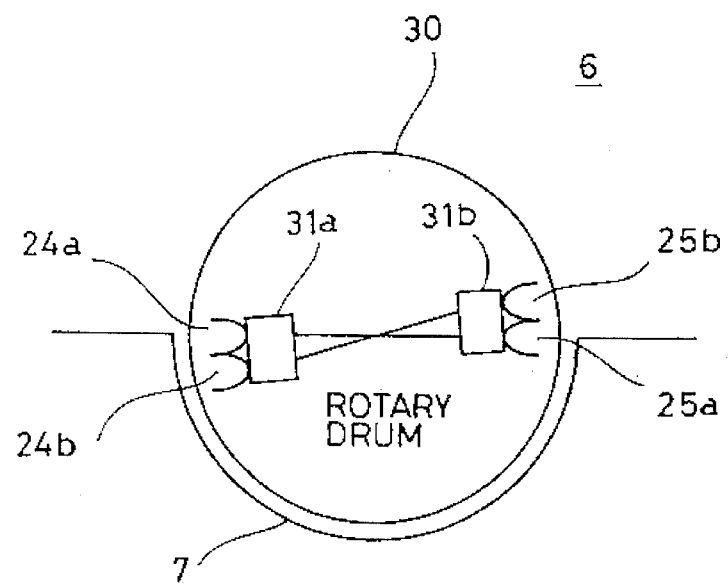
FIG. 29 schematically shows an arrangement of magnetic heads in a fourth embodiment of the invention.
Figure 30:
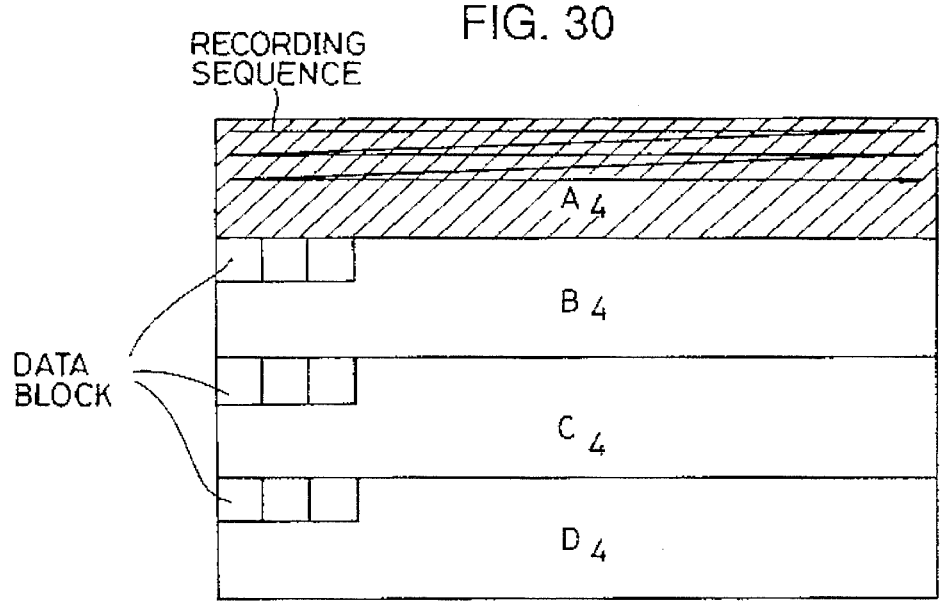
FIG. 30 schematically shows the manner of setting rectangular regions in a screen in the fourth embodiment of the invention.
Figure 31:
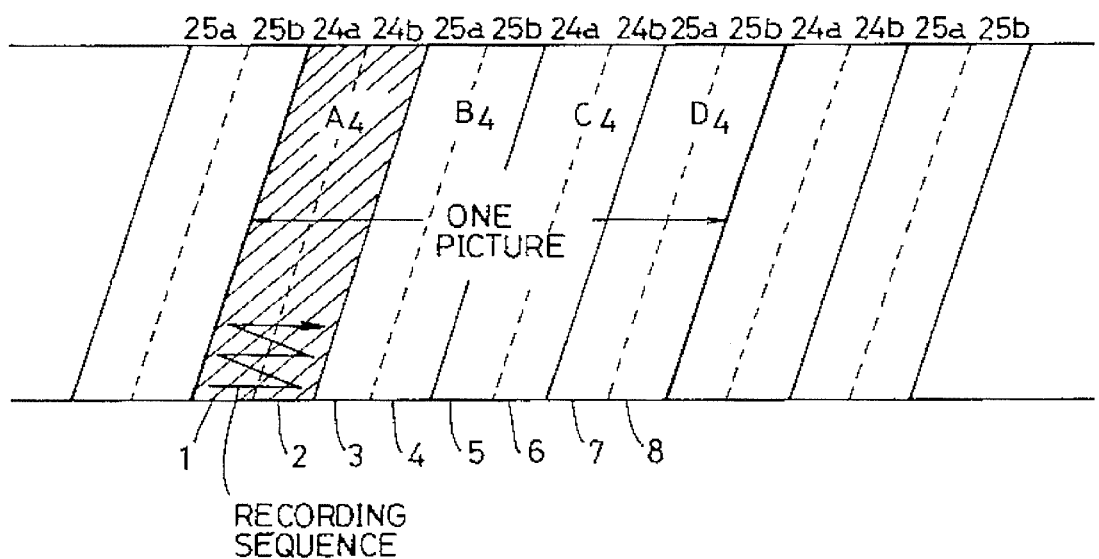
FIG. 31 schematically shows a data arrangement in tracks on a tape in a digital VCR according to the fourth embodiment of the invention.

FIG. 29 schematically shows an arrangement of magnetic heads in a digital VCR of a fourth embodiment of the invention. Heads 24a, 24b, 25a and 25b are movable heads which can be moved in the track width direction by means of head moving devices 31a and 31b. The digital VCR of the fourth embodiment basically has the same structure as that of the second embodiment shown in FIG. 14 and a controlling circuit 32 for controlling positions of the movable heads is provided as shown in FIG. 14. While the four rectangular regions A3, B3, C3 and D3 are formed by quartering the screen with respect to the horizontal direction in the foregoing third embodiment, as shown in FIG. 22, the screen in the fourth embodiment, which will be described below, is quartered into four rectangular regions A4, B4, C4 and D4, with respect to the vertical direction as shown in FIG. 30. Video signals for the respective regions are recorded by the corresponding magnetic head pairs in the corresponding tracks on the magnetic tape in accordance with the recording sequence indicated by an arrow in FIG. 31. For example, data of a plurality of blocks for the uppermost rectangular region A4 in FIG. 30 is recorded by the magnetic head pairs 24a and 24b in the track pair (tracks 1 and 2) at the left end among the four track pairs for one picture defined between thick solid lines in FIG. 31 during the initial half rotation of the rotary drum 30. The data of blocks for the rectangular region B4 at the second position in FIG. 30 is recorded in the track pair (tracks 3 and 4) at the second position from the left in FIG. 31 among the four track pairs by the magnetic head pairs 25a and 25b during the next half rotation of the rotary drum 30. The data of blocks for the rectangular region C4 at the third position in FIG. 30 is recorded in the track pair (tracks 5 and 6) at the third position from the left in FIG. 31 among the four track pairs by the magnetic head pairs 24a and 24b during the next half rotation of the rotary drum 30. The data of blocks for the rectangular region D4 at the lowermost position in FIG. 30 is recorded in the track pair (tracks 7 and 8) at the right end in FIG. 31 among the four track pairs by the magnetic head pairs 25a and 25b during the next half rotation of the rotary drum 30.

Figure 32:
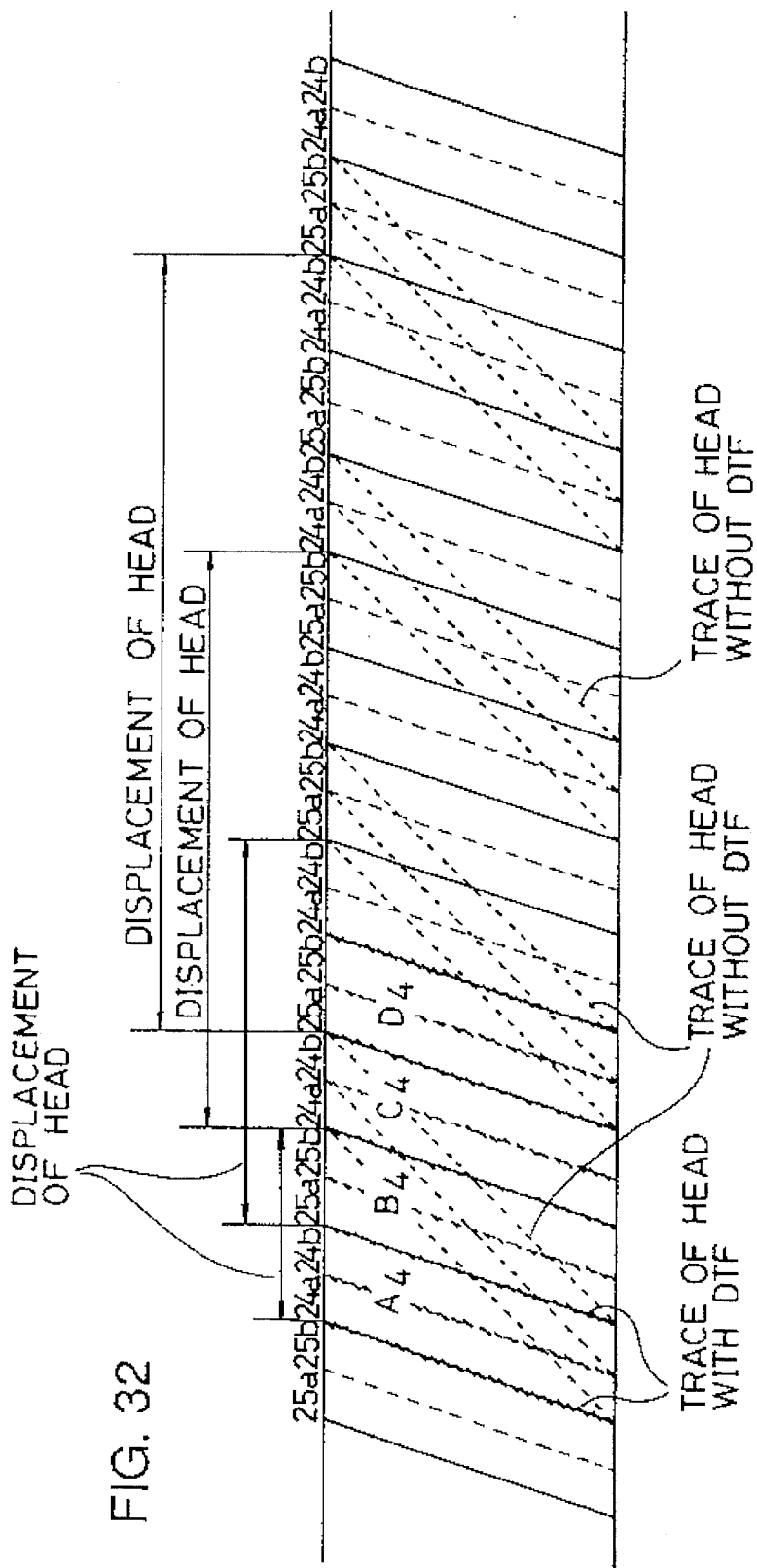
FIGS. 32 and 33 each schematically shows the relation between recording tracks formed on a tape by a digital VCR of the fourth embodiment of the invention and a trace of a head during a high speed reproduction.

Now, an operation of the fourth embodiment for the triple speed reproduction will be described below. If it is assumed that there is not any limit in displacements of the movable heads 24a, 24b, 25a and 25b, it is desirable to control the positions of the movable heads with displacement in four steps, as shown in FIG. 32 for the reason already described in connection with the second embodiment with reference to FIG. 18. More specifically, in the case shown in FIG. 32, one picture to be reproduced is formed of the data belonging to the same field, so that it is not necessary to define the relationship between the positions of data on the tracks and the positions of data on the screen. For this reason, the above control is desirable.

Figure 33:
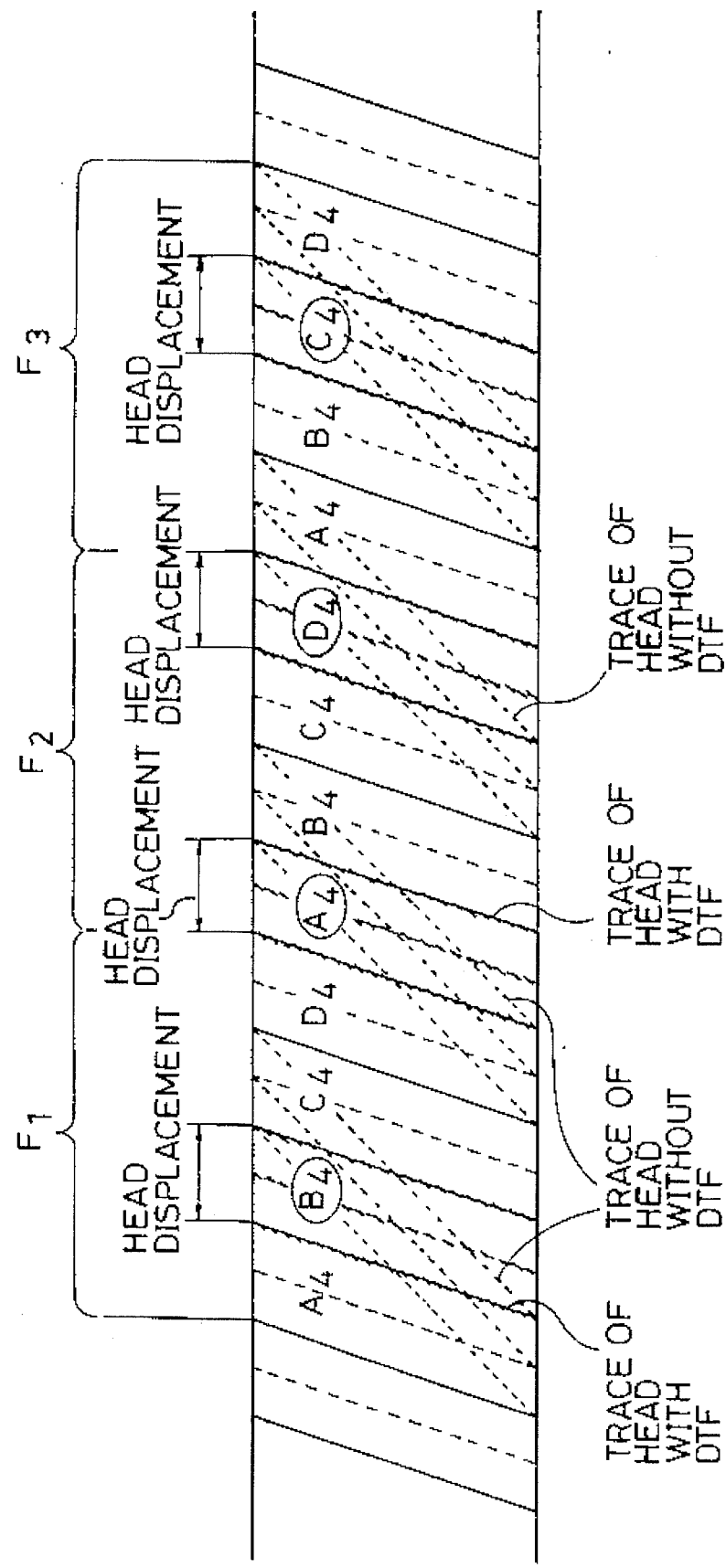
Figure 34:
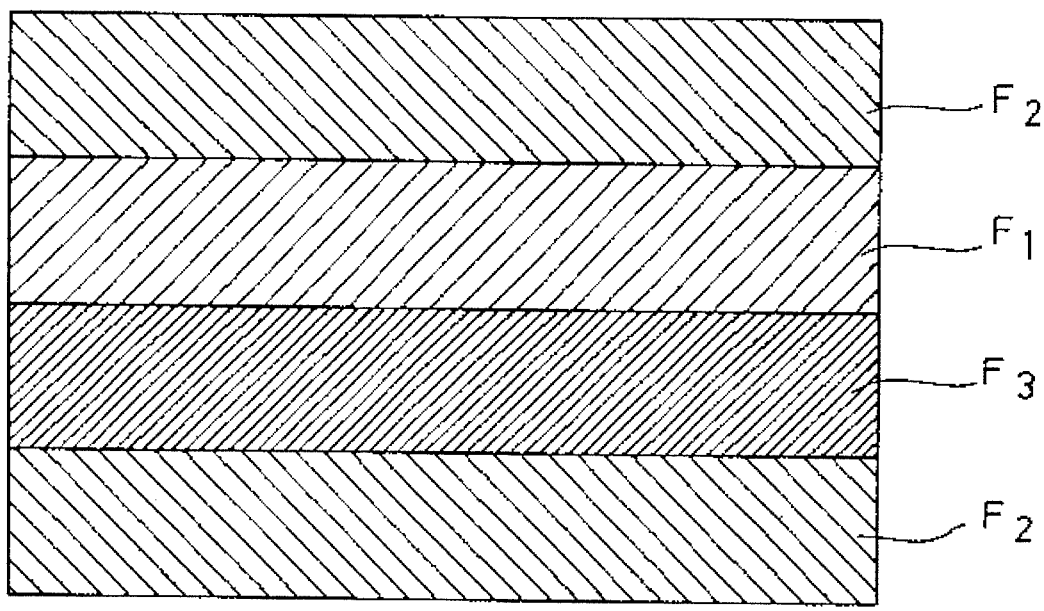
FIG. 34 schematically shows a reproduced picture in the high speed reproduction in the fourth embodiment of the invention.

In practice, however, there is a limit in the displacement of the movable heads as already described, and thus reduction of the displacement is desirable in view of mechanical loads on the heads. In the fourth embodiment, therefore, the positions of the movable heads are controlled as shown in FIG. 34. In this case, each of F1, F2 and F3 in FIG. 33 indicates track pairs wherein data of one picture is recorded and more specifically, the data in the uppermost rectangular region A4 in FIG. 33 is recorded in the track pair A4, the data in the middle rectangular region B4 is recorded in the track pair B4, the data in the third rectangular region C4 is recorded in the track pair C4 and the data in the lowermost rectangular region D4 is recorded in the track pair D4. If the heads are DTF controlled to scan the track pair B4 of F1, the track pair A4 of F2, the track pair D4 of F2 and the track pair C4 of F3 as shown in FIG. 33 in such situation, the data belonging to the three fields F1-F3 are displayed in the triple speed reproduction at vertically aligned four different regions, as shown in FIG. 34, resulting in excellent quality of the picture reproduced at the triple speed.

In the above description, the rectangular regions, for which data are recorded on the corresponding tracks, are formed by the division with respect to only one direction, i.e., the horizontal direction (first and third embodiments) or the vertical direction (second and fourth embodiment). However, other regions may be formed by the division in both the directions, in view of balance of mixed fields in the reproduced picture at the extraordinary speed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital reproducing apparatus for digitally reproducing a recorded digital video signal, comprising:

means for detecting, at a changeable speed, error correction blocks recorded on tracks of a recording medium, each of said error correction blocks corresponding to one of a plurality of blocks which constitute an image on a display screen, said display screen being divided horizontally and/or vertically into N rectangular regions, and said error correction blocks being divided into N sets, each of said N sets corresponding to one of said N rectangular regions, and, error correction blocks in each set for each track being consecutively recorded and each pair of consecutively recorded error correction blocks having corresponding blocks of said display screen which are adjacent means for rearranging said detected error correction blocks into an original order which was established prior to recording;

means for reconstructing fixed length blocks, which were formed at the time of recording, by applying an error correction process to said rearranged error correction blocks and thereby correcting an error generated at the time of reproduction;

means for decoding a digital video signal for each of said reconstructed fixed length blocks; and means for restoring the arrangement of said digital video signal, which was established at the time of recording, based on said decoded digital video signal for each of said reconstructed fixed length blocks.

2. A digital recording apparatus according to claim 1, further comprising concealing means for replacing a reconstructed fixed length block with a previously reconstructed fixed length block which corresponds to the same block in said display screen as said reconstructed fixed length block being replaced when said reconstructing means fails to correct an error in said reconstructed fixed length block being replaced.

3. A digital reproducing apparatus according to claim 2, wherein said concealing means determines whether to conceal each reconstructed fixed length block based on a possibility of successively reproducing a number of said error correction blocks on a track at a relatively low speed, and based on a possibility of reproducing each of said error correction blocks at a relatively high speed.

4. A digital reproducing apparatus according to claim 3, wherein said means for detecting detects said error correction blocks which, at the time of recording, were rearranged so that said error correction blocks corresponding to blocks of said display screen in said N rectangular regions, which are obtained by dividing said screen into N rectangular regions with respect to the horizontal direction, are recorded on N tracks, respectively, wherein said means for detecting includes, at least one movable head which is movable widthwise on a track, and movable head position controlling means for controlling a position of said movable head widthwise on said track in accordance with an extraordinary speed during reproduction at the extraordinary speed, so that a positional variation of said movable head may be minimized and the digital video signals forming one picture may be scanned in a period for one picture.

5. A digital reproducing apparatus according to claim 3, wherein said means for detecting detects said error correction blocks which, at the time of recording, were rearranged so that said error correction blocks corresponding to blocks of said display screen in said N rectangular regions, which are obtained by dividing said screen into N rectangular regions with respect to the vertical direction, are recorded on N×M (M is a positive integer) tracks with each of said N rectangular regions being divided into M channels, wherein said means for detecting includes:

movable heads which are movable widthwise on a track, and movable head position controlling means for controlling a position of said movable head widthwise on said track in accordance with an extraordinary speed during reproduction at a extraordinary speed, so that a positional variation of said movable heads may be minimized and the digital video signals forming one picture may be scanned in a period for one picture.

6. A digital recording apparatus for digitally recording a supplied digital video signal, comprising:

blocking means for dividing said digital video signal into a plurality of data blocks, each data block corresponding to a block of display screen, said display screen being horizontally and/or vertically divided into N rectangular regions, thus, each of said N rectangular regions has one corresponding set of error correction blocks;

means for encoding each of said data blocks;

means for controlling a code amount of said encoding, on the basis of at least one data block, to form fixed length blocks;

means for encoding said fixed length blocks for error correction, which is to be performed during reproduction, to form error correction blocks, therefore, each error correction block has a corresponding block on said display screen;

means for recording said error correction blocks on tracks of a recording medium; and means for rearranging said error correction blocks for each track prior to recording so that, for each set of error correction blocks, said error correction blocks are consecutively recorded and each pair of consecutively recorded error correction blocks have corresponding blocks of said display screen which are adjacent.

7. A digital recording apparatus according to claim 6, wherein said rearranging means rearranges said error correction blocks so that said error correction blocks corresponding to blocks of said display screen in said N rectangular regions, which are obtained by dividing said screen into N rectangular regions with respect to a horizontal direction, are recorded on N tracks, respectively.

8. A digital recording apparatus according to claim 6, wherein said rearranging means rearranges said error correction blocks so that said error correction blocks corresponding to blocks of said display screen in said N rectangular regions, which are obtained by dividing said screen into N rectangular regions with respect to a vertical direction, are recorded on N tracks, respectively.

9. A digital recording apparatus according to claim 6, wherein said recording means includes recording heads; and said rearranging means rearranges said error correction blocks so that said error correction blocks corresponding to blocks of said display screen in said N rectangular regions, which are obtained by dividing said screen into N rectangular regions with respect to a horizontal direction, are recorded on N×M (M is a positive integer) tracks of said recording medium with each of said N rectangular regions being divided into M channels.

10. A digital recording apparatus according to claim 9, wherein said recording medium includes two pairs of recording heads, and each pair of recording heads records, on adjacent tracks, said error correction blocks corresponding to blocks of said display screen in only one of said N rectangular regions.

11. A digital recording apparatus according to claim 6, wherein said recording means includes recording heads; and said rearranging means rearranges said error correction blocks so that said error correction blocks corresponding to blocks of said display screen in said N rectangular regions, which are obtained by dividing said screen into N rectangular regions with respect to a vertical direction, are recorded on N×M tracks of said recording medium with each of said N rectangular regions being divided into M channels.

12. A digital recording apparatus according to claim 11, wherein said recording medium includes two pairs of recording heads, and each pair of recording heads records, on adjacent tracks, said error correction blocks corresponding to blocks of said display screen in only one of said N rectangular regions.

13. A digital recording apparatus according to claim 6, wherein said rearranging means rearranges said error correction blocks so that error correction blocks recorded on a track of said recording medium correspond to blocks of said display screen in only one of said N rectangular regions.

14. A digital recording and reproducing apparatus for digitally recording a supplied digital video signal, comprising:

blocking means for dividing said digital video signal into a plurality of data blocks, each data block corresponding to a block of display screen, said display screen being horizontally and/or vertically divided into N rectangular regions, thus, each of said N rectangular regions has one corresponding set of error correction blocks;

means for encoding each of said data blocks;

means for controlling a code amount of said encoding on the basis of at least one data block, to form fixed length blocks;

means for encoding said fixed length blocks for error correction, which is to be performed during reproduction, to form error correction blocks, therefore, each error correction block has a corresponding block on said display screen;

means for recording said error correction blocks on tracks of a recording medium;

means for rearranging said error correction blocks for each track prior to recording so that, for each set of error correction blocks, said error correction blocks are consecutively recorded and each pair of consecutively recorded error correction blocks have corresponding blocks of said display screen which are adjacent;

means for detecting, at a changeable speed, said error correction blocks;

means for rearranging said detected error correction blocks into an original order which was established prior to recording;

means for reconstructing fixed length blocks, which were formed at the time of recording, by applying an error correction process to said rearranged error correction blocks and thereby correcting an error generated at the time of reproduction;

means for decoding a digital video signal for each of said reconstructed fixed length blocks; and means for restoring the arrangement of said digital video signal, which was established at the time of recording, based on said decoded digital video signal for each of said reconstructed fixed length blocks.

15. A digital recording and reproducing apparatus according to claim 14, further comprising concealing means for replacing a reconstructed fixed length block with a previously reconstructed fixed length block which corresponds to the same block in said display screen as said reconstructed fixed length block being replaced when said reconstructing means fails to correct an error in said reconstructed fixed length block being replaced.

16. A digital recording and reproducing apparatus according to claim 15, wherein said concealing means determines whether to conceal each reconstructed fixed length block based on a possibility of successively reproducing a number of said error correction blocks on a track at a relatively low speed, and based on a possibility of reproducing each of said error correction blocks at a relatively high speed.

17. A digital recording and reproducing apparatus according to claim 16, wherein said rearranging means rearranges said error correction blocks so that said error correction blocks corresponding to blocks of said display screen in said N rectangular regions, which are obtained by dividing said screen into N rectangular regions with respect to a horizontal direction, are recorded on N tracks, respectively.

18. A digital recording and reproducing apparatus according to claim 16, wherein said rearranging means rearranges said error correction blocks so that said error correction blocks corresponding to blocks of said display screen in said N rectangular regions, which are obtained by dividing said screen into N rectangular regions with respect to a vertical direction, are recorded on N tracks, respectively.

19. A digital recording and reproducing apparatus according to claim 18, wherein said means for detecting said error correction blocks includes:

a movable head which is movable widthwise on a track, and movable head position controlling means for controlling a position of said movable head widthwise on said track in accordance with an extraordinary speed during reproducing at said extraordinary speed, so that a positional variation of said movable head may be minimized and the digital video signals forming one picture may be scanned in a period for one picture.

20. A digital recording and reproducing apparatus according to claim 16, wherein said recording means includes recording heads; and said rearranging means rearranges said error correction blocks so that said error correction blocks corresponding to blocks of said display screen in said N rectangular regions, which are obtained by dividing said screen into N rectangular regions with respect to a horizontal direction, are recorded on N×M (M is a positive integer) tracks of said recording medium with each of said N rectangular regions being divided into M channels.

21. A digital recording and reproducing apparatus according to claim 16, wherein said recording means includes recording heads; and said rearranging means rearranges said error correction blocks so that said error correction blocks corresponding to blocks of said display screen in said N rectangular regions, which are obtained by dividing said screen into N rectangular regions with respect to a vertical direction, are recorded on N×M (M is a positive integer) tracks of said recording medium with each of said N rectangular regions being divided into M channels.

22. A digital recording and reproducing apparatus according to claim 21, wherein said means for detecting said error correction block includes:

a movable head which is movable widthwise on a track, and movable head position controlling means for controlling a position of said movable head widthwise on said track in accordance with an extraordinary speed during reproducing at said extraordinary speed, so that a positional variation of said movable head may be minimized and the digital video signals forming one picture may be scanned in a period for one picture.

23. A digital recording apparatus for digitally recording a supplied digital video signal, comprising:

blocking means for dividing said digital video signal into a plurality of data blocks, each data block corresponding to a block of display screen, said display screen being horizontally and/or vertically divided into N rectangular regions, thus, each of said N rectangular regions has one corresponding set of error correction blocks, N being an integer greater than one;

means for encoding each of said data blocks;

means for controlling a code amount of said encoding, on the basis of at least one data block, to form fixed length blocks;

means for encoding said fixed length blocks for error correction, which is to be performed during reproduction, to form error correction blocks, therefore, each error correction block has a corresponding block on said display screen;

means for recording said error correction blocks on tracks of a recording medium; and means for rearranging said error correction blocks for each track prior to recording so that, for each set of error correction blocks, said error correction blocks are consecutively recorded.

24. A digital recording apparatus according to claim 23, wherein said rearranging means rearranges said error correction blocks prior to recording so that, for each set of error correction blocks, each pair of consecutively recorded error correction blocks have corresponding blocks of said display screen which are adjacent.

25. A digital recording and reproducing apparatus for digitally recording a supplied digital video signal, comprising:

blocking means for dividing said digital video signal into a plurality of data blocks, each data block corresponding to a block of display screen, said display screen being horizontally and/or vertically divided into N rectangular regions, thus, each of said N rectangular regions has one corresponding set of error correction blocks, N being an integer greater than one;

means for encoding each of said data blocks;

means for controlling a code amount of said encoding, on the basis of at least one data block, to form fixed length blocks;

means for encoding said fixed length blocks for error correction, which is to be performed during reproduction, to form error correction blocks, therefore, each error correction block has a corresponding block on said display screen;

means for recording said error correction blocks on tracks of a recording medium;

means for rearranging said error correction blocks for each track prior to recording so that, for each set of error correction blocks, said error correction blocks are consecutively recorded;

means for detecting, at a changeable speed, said error correction blocks;

means for rearranging said detected error correction blocks into an original order which was established prior to recording;

means for reconstructing fixed length blocks, which were formed at the time of recording, by applying an error correction process to said rearranged error correction blocks and thereby correcting an error generated at the time of reproduction;

means for decoding a digital video signal for each of said reconstructed fixed length blocks; and means for restoring the arrangement of said digital video signal, which was established at the time of recording, based on said decoded digital video signal for each of said reconstructed fixed length blocks.

26. A digital recording and reproducing apparatus according to claim 25, wherein said rearranging means rearranges said error correction blocks prior to recording so that, for each set of error correction blocks, each pair of consecutively recorded error correction blocks have corresponding blocks of said display screen which are adjacent.

27. A digital reproducing apparatus for digitally reproducing a recorded digital video signal, comprising:

means for detecting, at a changeable speed, error correction blocks recorded on tracks of a recording medium, each of said error correction blocks corresponding to one of a plurality of blocks which constitute an image on a display screen, said display screen being divided horizontally and/or vertically into N rectangular regions where N is an integer greater than one, and said error correction blocks being divided into N sets, each of said N sets corresponding to one of said N rectangular regions, and, error correction blocks in each set for each track being consecutively recorded;

means for rearranging said detected error correction blocks into an original order which was established prior to recording;

means for reconstructing fixed length blocks, which were formed at the time of recording, by applying an error correction process to said rearranged error correction blocks and thereby correcting an error generated at the time of reproduction;

means for decoding a digital video signal for each of said reconstructed fixed length blocks; and means for restoring the arrangement of said digital video signal, which was established at the time of recording, based on said decoded digital video signal for each of said reconstructed fixed length blocks.

28. A digital reproducing apparatus according to claim 27, wherein said error correction blocks are recorded so that, for each set of error correction blocks, each pair of consecutively recorded error correction blocks have corresponding blocks of said display screen which are adjacent.

* * * * *